(12) United States Patent
Shapira et al.

(10) Patent No.: US 9,959,360 B2
(45) Date of Patent: May 1, 2018

(54) GENERATING SEARCH RESULTS CONTAINING STATE LINKS TO APPLICATIONS

(71) Applicant: Samsung Electronics Co., Ltd., Suwon-si, Gyeonggi-do (KR)

(72) Inventors: Liron Shapira, Mountain View, CA (US); Tomer Kagan, Mountain View, CA (US); Matthew T. Elder, Los Altos, CA (US); Michael Harris, Mountain View, CA (US); Jonathan K. Lerner, San Jose, CA (US); Jonathan Ben-Tzur, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 14/195,709

(22) Filed: Mar. 3, 2014

(65) Prior Publication Data
US 2014/0250106 A1 Sep. 4, 2014

Related U.S. Application Data

(60) Provisional application No. 61/924,032, filed on Jan. 6, 2014, provisional application No. 61/771,614, filed on Mar. 1, 2013.

(51) Int. Cl.
G06F 7/02 (2006.01)
G06F 17/30 (2006.01)
(Continued)

(52) U.S. Cl.
CPC ...... *G06F 17/30882* (2013.01); *G06F 3/0481* (2013.01); *G06F 3/0482* (2013.01);
(Continued)

(58) Field of Classification Search
CPC ......... G06F 17/30864; G06F 17/30554; G06F 17/30241; G06F 17/30424; G06F 17/30876; G06F 17/30887; G06F 17/30
See application file for complete search history.

(56) References Cited

U.S. PATENT DOCUMENTS 7,730,012 B2 6/2010 Arrouye et al.
7,979,457 B1 * 7/2011 Garman ............ G06F 17/30864
705/26.8
(Continued)

FOREIGN PATENT DOCUMENTS

| CN | 1327195 A | 12/2001 |
|---|---|---|
| CN | 1882939 A | 12/2006 |
| JP | 2003132060 A | 5/2003 |

OTHER PUBLICATIONS

International Search Report and Written Opinion for PCT Application No. PCT/US2014/019859, dated Jun. 18, 2014.
(Continued)

*Primary Examiner* — Bruce Moser
(74) *Attorney, Agent, or Firm* — Jefferson IP Law, LLP

(57) ABSTRACT

A disclosure provides techniques for generating search results containing state links to applications. A method includes receiving a query containing one or more query parameters from a remote computing device and identifying a set of third party applications corresponding to the one or more query parameters. For each third party application, the method includes transmitting at least a subset of the one or more query parameters to a server associated with the third party application, receiving a response from the server associated with the third party application, and generating a state link to a native application version of the third party application based on the response. The method further includes providing the states links to the remote computing device.

20 Claims, 15 Drawing Sheets

(51) Int. Cl.
| | |
|---|---|
| *G06F 3/0484* | (2013.01) |
| *G06F 17/22* | (2006.01) |
| *G06F 3/0481* | (2013.01) |
| *G06F 3/0488* | (2013.01) |
| *G06Q 10/02* | (2012.01) |
| *G06F 3/16* | (2006.01) |
| *G06F 3/0482* | (2013.01) |
| *H04L 29/08* | (2006.01) |

(52) U.S. Cl.
CPC ...... *G06F 3/04842* (2013.01); *G06F 3/04847* (2013.01); *G06F 3/04883* (2013.01); *G06F 3/167* (2013.01); *G06F 17/2235* (2013.01); *G06F 17/3087* (2013.01); *G06F 17/3089* (2013.01); *G06F 17/30277* (2013.01); *G06F 17/30554* (2013.01); *G06F 17/30864* (2013.01); *G06F 17/30958* (2013.01); *G06Q 10/02* (2013.01); *H04L 67/02* (2013.01)

(56) References Cited

U.S. PATENT DOCUMENTS

| | | |
|---|---|---|
| 8,099,332 B2 | 1/2012 | Lemay et al. |
| 8,161,050 B2 | 4/2012 | Venolia |
| 8,386,455 B2 | 2/2013 | Basu et al. |
| 8,661,033 B2 | 2/2014 | Leppert et al. |
| 8,762,360 B2 | 6/2014 | Jiang et al. |
| 8,924,958 B1 | 12/2014 | Bangur et al. |
| 9,589,033 B1 | 3/2017 | Kuscher et al. |
| 2005/0004909 A1 | 1/2005 | Stevenson et al. |
| 2005/0222981 A1 | 10/2005 | Lawrence et al. |
| 2006/0287985 A1 | 12/2006 | Castro et al. |
| 2006/0294063 A1 | 12/2006 | Ali et al. |
| 2007/0211871 A1 | 9/2007 | Sjolander et al. |
| 2007/0220317 A1 | 9/2007 | Gerhart et al. |
| 2008/0009268 A1 | 1/2008 | Ramer et al. |
| 2008/0172357 A1 | 7/2008 | Rechis et al. |
| 2008/0201307 A1 | 8/2008 | Swartz |
| 2009/0138445 A1 | 5/2009 | White et al. |
| 2010/0306191 A1 | 12/2010 | LeBeau et al. |
| 2011/0072001 A1 | 3/2011 | Basu et al. |
| 2011/0209143 A1 | 8/2011 | Ierullo |
| 2011/0276568 A1 | 11/2011 | Fotev |
| 2011/0307833 A1 | 12/2011 | Dale et al. |
| 2012/0109944 A1 | 5/2012 | Hao |
| 2012/0124061 A1 | 5/2012 | Macbeth et al. |
| 2012/0124062 A1* | 5/2012 | Macbeth ............ G06F 9/445 707/749 |
| 2012/0150850 A1 | 6/2012 | Parthasarathy et al. |
| 2012/0166411 A1 | 6/2012 | MacLaurin et al. |
| 2012/0197765 A1 | 8/2012 | Kim et al. |
| 2012/0284247 A1 | 11/2012 | Jiang et al. |
| 2012/0316955 A1 | 12/2012 | Panguluri et al. |
| 2012/0323898 A1 | 12/2012 | Kumar et al. |
| 2013/0086027 A1 | 4/2013 | Hebert |
| 2013/0132896 A1 | 5/2013 | Lee et al. |
| 2013/0218870 A1 | 8/2013 | Bukurak et al. |
| 2013/0238609 A1 | 9/2013 | Marantz et al. |
| 2013/0268673 A1 | 10/2013 | Graham-Cumming |
| 2013/0290318 A1 | 10/2013 | Shapira et al. |
| 2013/0290319 A1 | 10/2013 | Glover et al. |
| 2013/0290321 A1 | 10/2013 | Shapira et al. |
| 2013/0290322 A1 | 10/2013 | Prosnitz et al. |
| 2013/0290344 A1 | 10/2013 | Glover et al. |
| 2013/0304729 A1 | 11/2013 | Jiang et al. |
| 2013/0318118 A1 | 11/2013 | Zhu |
| 2013/0325892 A1* | 12/2013 | Edwards ........... G06F 17/30864 707/769 |
| 2013/0337873 A1 | 12/2013 | Yang et al. |
| 2014/0006409 A1 | 1/2014 | Prosnitz et al. |
| 2014/0019442 A1 | 1/2014 | Mahaniok et al. |
| 2014/0040226 A1* | 2/2014 | Sadhukha ................ G06F 8/61 707/706 |
| 2014/0052683 A1 | 2/2014 | Kirkham et al. |
| 2014/0067846 A1 | 3/2014 | Edwards et al. |
| 2014/0172840 A1 | 6/2014 | Kumar et al. |
| 2014/0201179 A1 | 7/2014 | Chang et al. |
| 2014/0250147 A1 | 9/2014 | Shapira et al. |
| 2014/0358887 A1 | 12/2014 | Morris et al. |
| 2014/0359598 A1 | 12/2014 | Oliver et al. |
| 2014/0365462 A1 | 12/2014 | Chang |
| 2015/0052021 A1 | 2/2015 | Elias et al. |
| 2015/0193546 A1 | 7/2015 | Lipton et al. |
| 2015/0227523 A1 | 8/2015 | LeBeau et al. |
| 2015/0242420 A1 | 8/2015 | Glover et al. |
| 2015/0242421 A1 | 8/2015 | Glover et al. |
| 2015/0242422 A1 | 8/2015 | Shapira et al. |
| 2015/0242462 A1 | 8/2015 | Shapira et al. |
| 2015/0242507 A1 | 8/2015 | Shapira et al. |
| 2016/0117388 A1 | 4/2016 | Fan |
| 2016/0253343 A1 | 9/2016 | Shapira et al. |
| 2016/0253420 A1 | 9/2016 | Shapira et al. |
| 2016/0253421 A1 | 9/2016 | Shapira et al. |
| 2016/0253422 A1 | 9/2016 | Shapira et al. |
| 2016/0253430 A1 | 9/2016 | Shapira et al. |

OTHER PUBLICATIONS

AppURL connects native apps to the web with http URLs: https://web.archive.org/web/20130804070658/http://appurl.org, last accessed on Aug. 4, 2013.
Communication under Rule 70(2) and 70a(2) and Supplementary European Search Report and Written Opinion for European Application No. 147568737-1952 corresponding to PCT/US2014/019859.
International Preliminary Report on Patentability for PCT Application No. PCT/US2014/019859, dated Sep. 11, 2015, 9 pages.
Japan Patent Office Notice of Ground for Rejection for Patent Application No. JP 2015560392, dated Aug. 3, 2016, 4 pages.
The Stack Overflow Community; iOS—Stack Overflow; Android—Open the app from browser if exists or open the market to install the app; Nov. 2011; 3 pages.
Google Testing SERP With Up to 16 Product Listing ADS: http://www.rimmkaufman.com/blog/google-testing-serp-with16-product-listing-ads/16072013 accessed on Sep. 2, 2014.
Secrets of the 7-Result SERP: http://moz.com/blog/secrets-of-the-7-result-serp, accessed on Sep. 2, 2014.
SERPs: A Primer: http://www.goinflow.com/serps-primer/, accessed on Sep. 2, 2014.
Ask.com SERP: http://www.ask.com/web?qq=katy+perry, accessed on Sep. 2, 2014.
Bing.com SERP: http://www.bing.com/search?q=katy+perry, accessed on Sep. 2, 2014.
Google.com SERP: https://www.google.com/?#q=katy+perry, accessed on Sep. 2, 2014.
App Indexing: <https://web.archive.org/web/20140225132807/https://developers.google.com/app-indexing/webmasters/>, Dec. 4, 2013.
App Indexing Technical Details: <https://web.archive.org/web/20140210182226/https://developers.google.com/appindexing/webmasters/details>, Feb. 1, 2014.
Indexing Apps Just Like Websites: <http://googlewebmastercentral.blogspot.com/2013/10/indexing-apps-just-like-websites.html>, Oct. 31, 2013.
Google's Search Results Can Deep-Link to Your Android Apps: <http://techcrunch.com/2013/10/31/android-4-4-kitkat-app-indexing/>, Oct. 31, 2013.
International Search Report and Written Opinion for related WO Application No. PCT/US2015/016866, dated May 26, 2015.
PCT International Preliminary Report on Patentability dated Sep. 1, 2016 for PCT/US2015/016866, 6 pages.
Google Search Now Discovers Content Within Android Apps: http://searchengineland.com/google-search-now-discovers-content-within-android-apps-178960, Dec. 4, 2013.

* cited by examiner

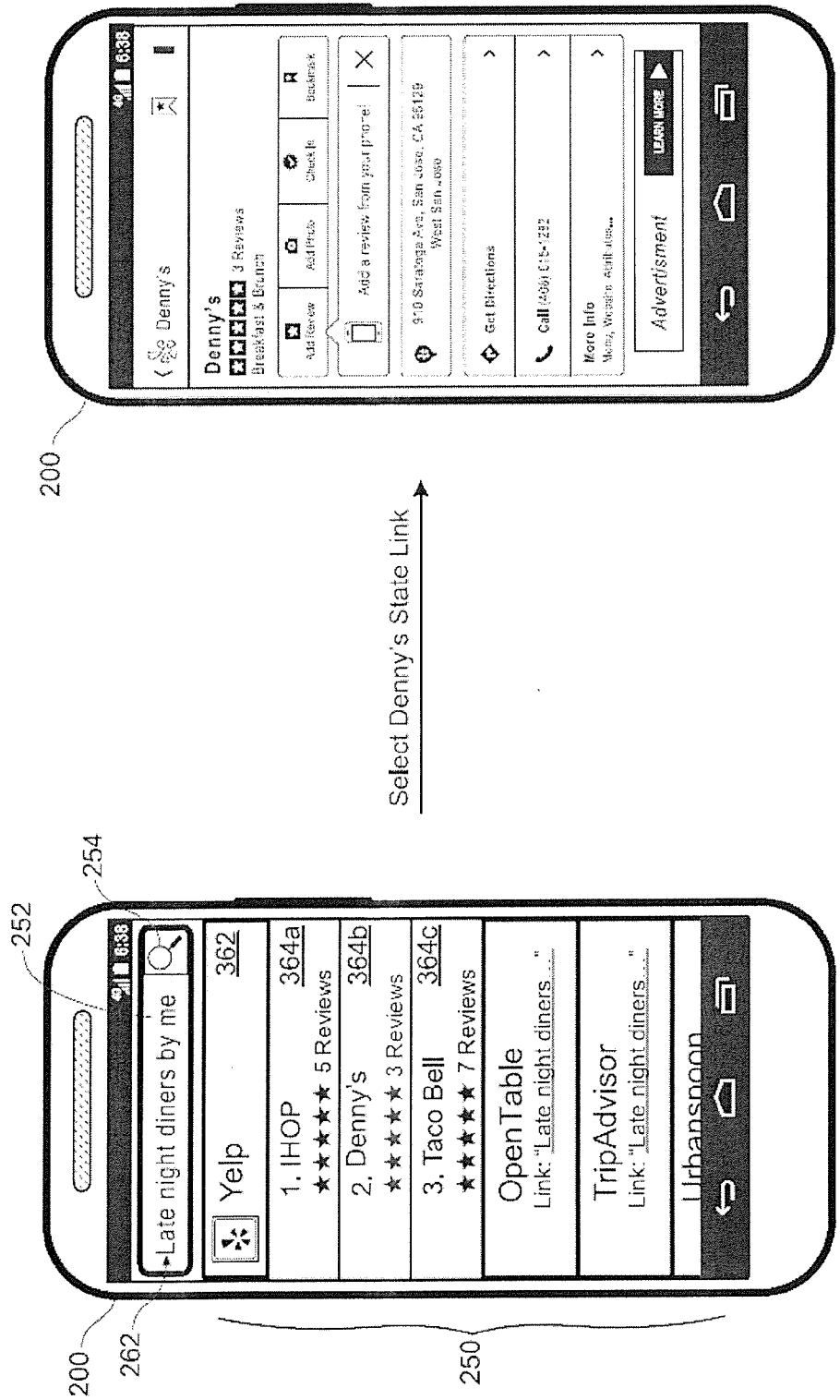

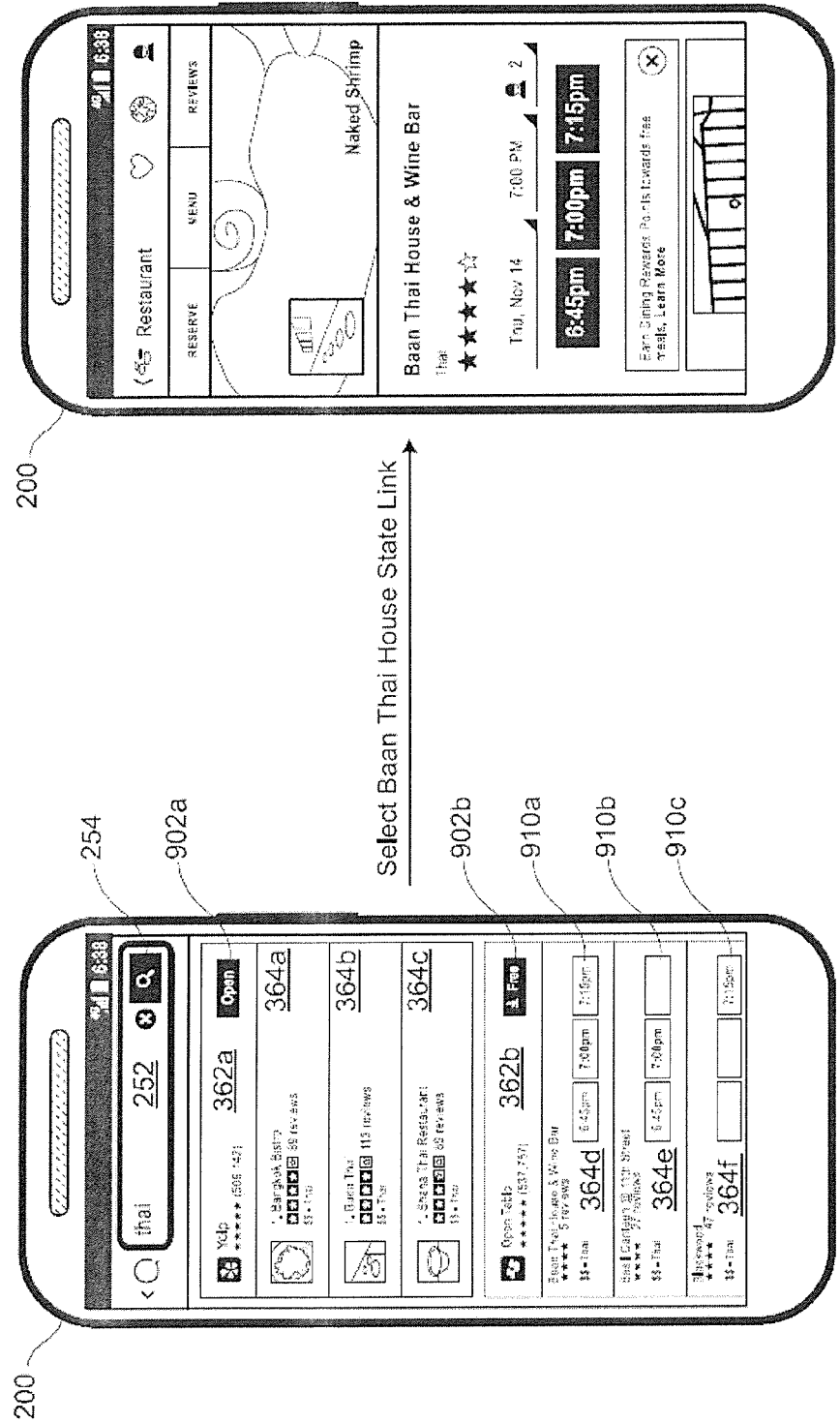

GENERATING SEARCH RESULTS CONTAINING STATE LINKS TO APPLICATIONS

PRIORITY CLAIM

This U.S. patent application claims priority to U.S. Provisional Application 61/771,614 filed on Mar. 1, 2013 and U.S. Provisional Application 61/924,032 filed on Jan. 6, 2014, the disclosures of which are considered part of the disclosure of this application and are hereby incorporated by reference in their entirety.

TECHNICAL FIELD

This disclosure relates to the field of search in computing environments. In particular, this disclosure relates to generating search results containing state links to applications.

BACKGROUND

The World Wide Web (the "Web") contains endless information and it continues to experience an explosive growth of information. Users access the information via web browsers which allow the users to view web pages containing the information. Due to the increasing number of webpages, web search engines became available to aid users in finding specific information. Most search engines perform three main functions: crawling, indexing, and searching. A web crawler is an automated web browser used to retrieve information from web pages. Once the web crawler collects the information on each web page, the information is then indexed in the search engine database. Indexing parses and stores the information gathered by the web crawler to expedite the retrieval of information. The searching process is initiated when a user enters a search query into the search engine. The search engine references its index and provides the results of the best matched web pages according to the provided query.

SUMMARY

One aspect of the disclosure provides a method for generating search results containing state links to applications. The method includes receiving a search query from a remote computing device, generating a state link to a state of a native application based on the search query and providing the state link to the remote computing device, all by a processing device. In some implementations, the state link is provided to the remote computing device with one or more other state links to third party applications. In some implementations, the native application is a third party native application. The native application can correspond to a third party application having one or more versions. The state link can include an application resource identifier corresponding to the native application and is used to access the state in the native application version of the third party application.

Implementations of the disclosure may include one or more of the following features. In some implementations, the state link further includes a web resource identifier being used to access a web application corresponding to the third party application at the same state of the third party application. The state link may include one or more other application resource identifiers.

In some examples, determining the state link includes determining an application resource identifier based on the search query and embedding the application resource identifier into the state link. Additionally or alternatively, the native application may correspond to a third party application. The third party application has one or more versions including the native application. Determining the application resource identifier may include generating a request to a server associated with the third party application based on the search query, receiving a response from the server associated with the third party application and generating the application resource identifier based on the response. The response may include a web resource identifier to access a web application version of the third party application at the state. Generating the application resource identifier may include converting the web resource identifier to the application resource identifier using a conversion rule.

In some implementations, determining the application resource identifier includes identifying a command template corresponding to the native application and generating the application resource identifier based on the command template and the search query. The command template indicates the native application and includes one or more parameter fields that receive state parameters.

Another aspect of the disclosure provides a search server. The search server includes a network interface device and a processing device. The processing device executes computer readable instructions. When the instructions are executed by the processing device, the instructions cause the processing device to receive a search query from a remote computing device via the network interface device, generate a state link to a state of a native application based on the search query and provide the state link to the native application to the remote computing device. The state link may be provided to the remote computing device with one or more other state links to the third party application. The native application is a third party native application. The native application corresponds to a third party application having one or more versions. The state link includes an application resource identifier corresponding to the native application and is used to access the state in the native application version of the third party application. The state link further includes a web resource identifier being used to access a web application corresponding to the third party application at the same state of the third party application. The state link includes one or more other application resource identifiers.

In some implementations, the computer readable instructions cause the processing device to determine the state link by determining an application resource identifier based on the search query and embedding the application resource identifier into the state link. The native application can correspond to a third party application. The third party application can have one or more versions including the native application. In some implementations, the computer readable instructions cause the processing device to determine the application resource identifier by generating a request to a server associated with the third party application based on the search query, receiving a response from the server associated with the third party application, and generating the application resource identifier based on the response.

In some examples, the response includes a web resource identifier to access a web application version of the third party application at the state. In some implementations, the computer readable instructions cause the processing device to generate the application resource identifier by converting the web resource identifier to the application resource identifier using a conversion rule. The computer readable instructions cause the processing device to determine the application resource identifier by identifying a command template corresponding to the native application and generating the application resource identifier based on the command template and the search query. The command template indicates the native application and includes one or more parameter fields that receive state parameters.

Another aspect of the disclosure provides a method for generating search results containing state links to applications. The method includes receiving a query containing one or more query parameters from a remote computing device and identifying a set of third party applications corresponding to the one or more query parameters, all by a processing device. For each third party application, the method includes transmitting at least a subset of the one or more query parameters to a server associated with the third party application, receiving a response from the server associated with the third party application, and generating a state link to a native application version of the third party application based on the response. The method further includes providing the states links to the remote computing device. The one or more query parameters include a search query including one or more query terms. The one or more query parameters further include one or more of a geolocation of the remote computing device, an operating system of the remote computing device, or an identifier of a user of the remote computing device.

In some examples, the state link provides access to a state of a native application version of the third party application. In some implementations, the state link includes a screen shot indicative of the state. In some implementations, the state link includes an application resource identifier indicating a reference to the native application version and one or more state parameters corresponding to the state. The one or more state parameters can be used by the native application to access the state. Additionally or alternatively, the state link may include a web resource identifier indicating a domain name of a web server associated with the third party application and the one or more state parameters. The web server hosts a web application version of the third party application.

In some examples, transmitting the query parameters includes transmitting at least a subset of the one or more query parameters to a web server that hosts a web application that is a web application version of the third party application. Transmitting the query parameters may further include selecting a command template corresponding to the third party application from a plurality of command templates, formatting an outgoing request based on the command template and at least a subset of the one or more query parameters and transmitting the outgoing request to the web server.

In some implementations, receiving the response includes receiving a web resource identifier indicating a domain name of a web server associated with the third party application and one or more state parameters corresponding to a state of the web application that are used by the web application to access the state. Determining the state link to the native application includes converting the web resource identifier to an application resource identifier indicating a reference to the native application version of the third party application and the one or more state parameters. The remote computing device is configured to use the application resource identifier to launch the native application to the state indicated by the one or more state parameters. The remote computing device is configured to receive the state link and to attempt to access the state on the native application version using the application resource identifier before attempting to access the web application version using the web resource identifier.

Yet another aspect of the disclosure provides a search server for generating search results containing state links to applications. The search server includes a network interface device and a processing device. The processing device executes computer readable instructions, that when executed by the processing device, cause the processing device to receive a query containing one or more query parameters from a remote device and identify a set of third party applications corresponding to the one or more query parameters. For each third party application, the processing device transmits at least a subset of the one or more query parameters to a server associated with the third party application, receives a response from the server associated with the third party application, and generates a state link to a native application version of the third party application based on the response. The processing device provides the state links to the remote computing device. The one or more query parameters include a search query including one or more query terms. The one or more query parameters can further include one or more of a geolocation of the remote computing device, an operating system of the remote computing device, or an identifier of a user of the remote computing device.

In some implementations, the state link provides access to a state of a native application version of the third party application and provides the state link to the remote computing device. In some implementations, the state link includes an application resource identifier indicating a reference to the native application version and one or more state parameters corresponding to the state. The one or more state parameters are can be used by the native application to access the state. Additionally or alternatively, the state link may further include a web resource identifier indicating a domain name of a web server associated with the third party application and the one or more state parameters. The web server hosts a web application version of the third party application. The computer readable instructions cause the processing device to transmit the query parameters by transmitting at least a subset of the one or more query parameters to a web server that hosts a web application that is a web application version of the third party application. In some implementations, the state link includes a screen shot indicative of the state.

In some examples, the computer readable instructions further cause the processing device to transmit the query parameters by selecting a command template corresponding to the third party application from a plurality of command templates, formatting an outgoing request based on the command template and at least a subset of the one or more query parameters and transmitting the outgoing request to the web server. Additionally or alternatively, the computer readable instructions may cause the processing device to receive the response by receiving a web resource identifier indicating a domain name of a web server associated with the third party application and the one or more state parameters corresponding to a state of the web application that are used by the web application to access the state.

In some implementations, the computer readable instructions further cause the processing device to determine the state link to the native application by converting the web resource identifier to an application resource identifier indicating a reference to the native application version of the third party application and the one or more state parameters. The remote computing device is configured to use the application resource identifier to launch the native application to the state indicated by the one or more state parameters. In some scenarios, the remote computing device may be configured to receive the state link and to attempt to access the state on the native application version using the application resource identifier before attempting to access the web application version using the web resource identifier.

Yet another aspect of the disclosure provides a method for generating search results containing state links to applications. The method includes receiving a query containing one or more query parameters from a remote computing device and identifying a set of third party applications corresponding to the one or more query parameters. For each third party application, the method includes selecting a command template corresponding to the third party application from a plurality of command templates, generating a resource identifier corresponding to the third party application based on the command template and at least a subset of the one or more query parameters, and generating a state link based on the resource identifier. The method further includes providing the state links to the remote computing device, all by the processing device. The one or more query parameters include a search query including one or more query terms, and may include one or more of a geolocation, an operating system, or an identifier of the remote computing device. The command template is selected based on a functionality implicated in the query, and may be formatted to leverage a specific functionality of the third party application.

The remote computing device can be configured to access the third party application using the state link. In some examples, the resource identifier is a web resource identifier indicating a domain name of a web server that hosts a web application version of the third party application. The web resource identifier can include one or more state parameters corresponding to the at least the subset of the query parameters. In some implementations, the web resource identifier may be a uniform resource locator. The resource identifier may be an application resource identifier indicating a native application version of the third party application. The application resource identifier can further include one or more state parameters corresponding to the at least the subset of the query parameters.

In some implementations, the state link includes at least one application resource identifier and at least one web resource identifier. The remote computing device can be configured to receive the state link and to attempt to access the state on the native application version using the application resource identifier before attempting to access the web application version using the web resource identifier. In some implementations, the state link includes a screen shot indicative of the state.

Yet another aspect of the disclosure provides a search server for generating search results containing state links to applications. The search server includes a network interface device and a processing device that executes computer readable instructions. When the instructions are executed, the processing device receives a query containing one or more query parameters from a remote computing device and identifies a set of third party application corresponding to the one or more query parameters. For each third party application, the processing device selects a command template corresponding to the third party application from a plurality of command templates, generates a resource identifier corresponding to the third party application based on the command template and at least a subset of the one or more query parameters, and generates a state link based on the resource identifier. The processing device provides the state links to the remote computing device. The command template can be selected based on a functionality implicated in the query and may be formatted to leverage a specific functionality of the third party application. The remote computing device can be configured to access the third party application using the state link.

In some scenarios, the resource identifier is a web resource identifier indicating a domain name of a web server that hosts a web application version of the third party application. The web resource identifier can further include one or more state parameters corresponding to the at least the subset of the query parameters.

In some scenarios, the resource identifier is an application resource identifier indicating a native application version of the third party application. The application resource identifier can further include one or more state parameters corresponding to the at least the subset of the query parameters.

In some implementations, the state link may include at least one application resource identifier and at least one web resource identifier. The remote computing device is configured to receive the state link and to attempt to access the state on the native application version using the application resource identifier before attempting to access the web application version using the web resource identifier. The state link may include a screen shot indicative of the state.

DESCRIPTION OF DRAWINGS

FIGS. 7A-10 illustrate various examples of searches that can be performed on a remote computing device.

Like reference symbols in the various drawings indicate like elements.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that, wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1A:
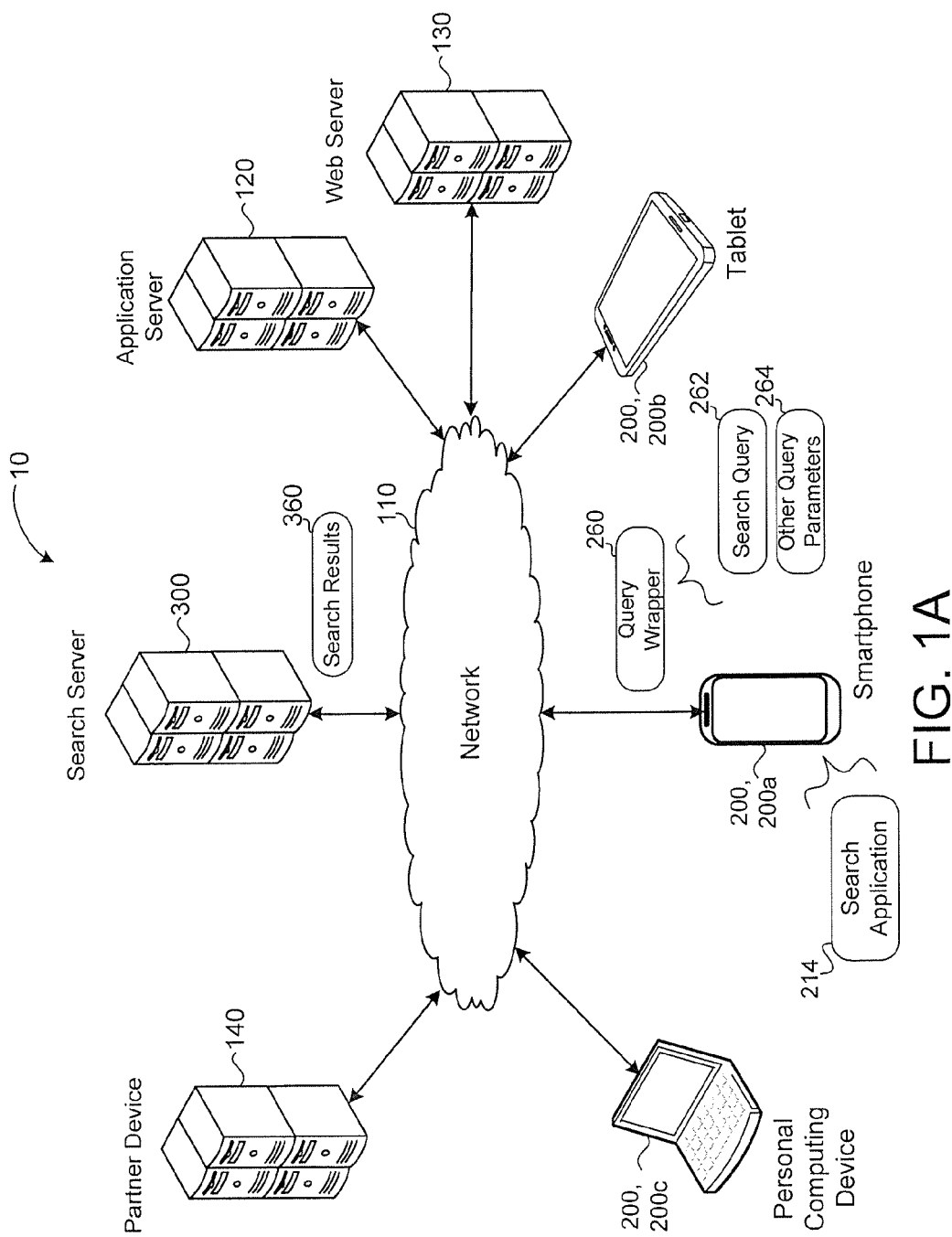
FIGS. 1A and 1B illustrate an example system for performing searches.
Figure 1B:
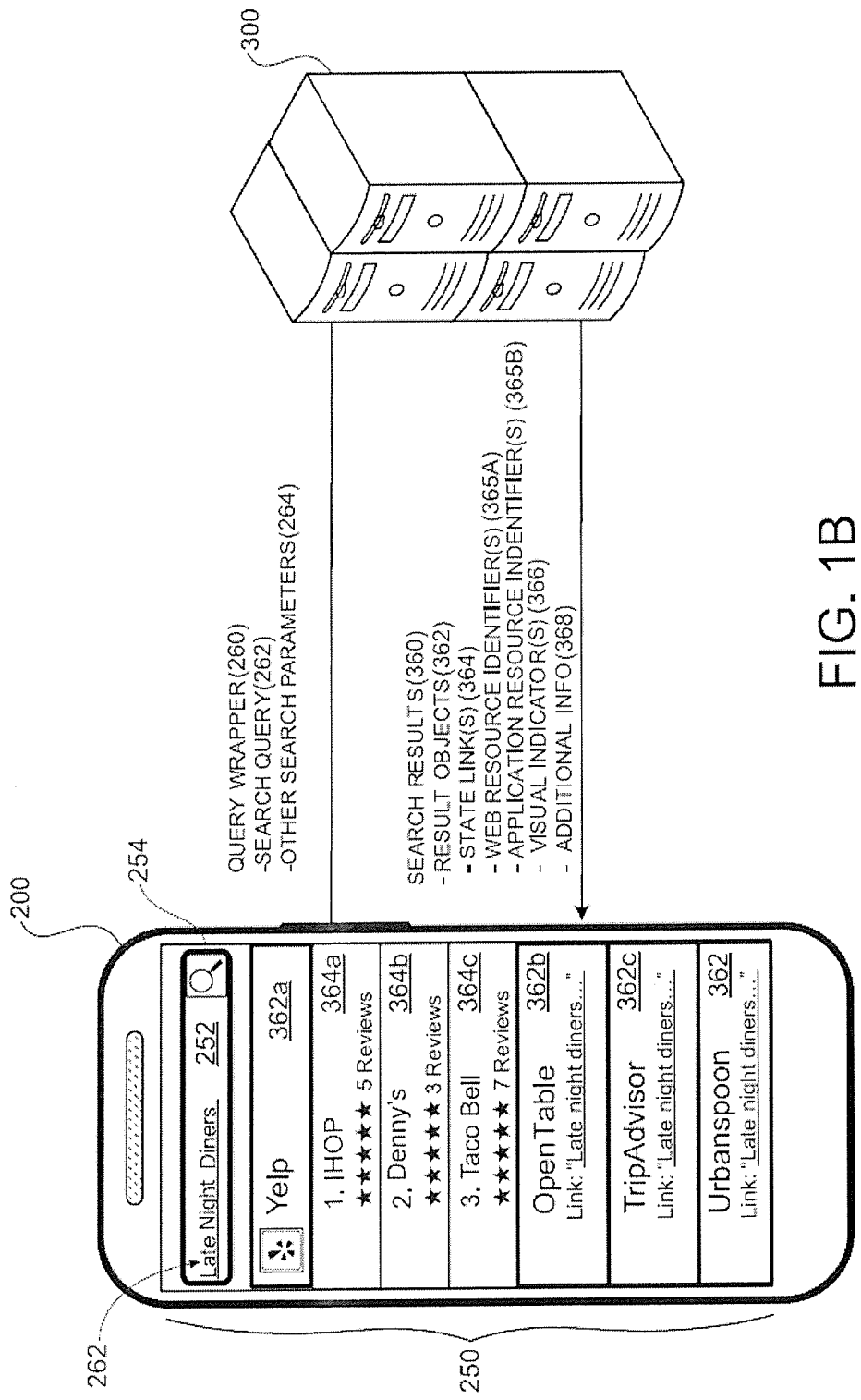

FIGS. 1A and 1B illustrate an example system 10 for performing searches. The system 10 includes a search server 300 in communication with one or more remote computing devices 200 via a network 110. The remote computing devices 200 can refer to, for example, a mobile computing device (e.g., a smartphone 200a or a tablet computer 200b), a stationary computing device 200c (e.g., a desktop computer or laptop device), wearable computers, video game consoles, smart appliances, and/or any other suitable device that includes a user interface and a network interface device. The search server 300 can also communicate with application servers 120 and web servers 130 via the network 110. The search server 300 and the remote computing devices 200 are further described below. The term "server" may refer to computing devices that primarily serve client devices, such as remote computing devices 200 or other servers. Furthermore, while FIGS. 1A and 1B depict a standalone server, the search server 300 may be a collection of devices at one or more data centers. These devices may work independently or in a distributed manner. Although FIGS. 1A and 1B illustrate one of each respective device type, the system 10 can include any number and/or combination of devices.

In operation, a remote computing device 200 can execute, at least in part, a search application 214 that displays a graphical user interface (GUI) 250 that allows a user to enter search queries 262. A search query 262 is a query parameter that the remote computing device 200 provides to the search server 300, which the search server 300 uses to determine search results 360. For example, the user may enter a search query 262 into a search bar 252 (e.g., a search box) of the GUI 250 using a touchscreen keypad, a mechanical keypad, and/or via speech recognition. A search query 262 may include one or more query terms. A query term may refer to a word, number, and/or symbol in the search query 262. The user can interact with the GUI 250 of the search application 214 to transmit the search query 262 to the search server 300. For example, with respect to FIG. 1B, a user can enter the search query 262 (i.e., "Late Night Diners") and select (e.g., touch or click) a search button 254 of the GUI 250 in order to transmit the search query 262 to the search server 300.

In some examples, the remote computing device 200 (e.g., the search application 214) may transmit additional query parameters 264 to the search server 300 along with the search query 262. The additional query parameters 264 can include, for example, platform data (e.g., device type, operating system version, web-browser version, a list of native application installed on the remote computing device 200), geo-location data (e.g., the location of the remote computing device 200), an identity of a user of the remote computing device 200 (e.g., a username), user preferences (e.g., user's language preference, user's location preferences, whether the user prefers free applications or pay applications, user's browsing history) partner specific data, and/or other suitable data. In some implementations, the search application 214 can bundle the search query 262 and the additional query parameters 264 into a query wrapper 260. A query wrapper 260 can contain the query parameters 262, 264 in a format defined by a schema implemented by the search server 300. In some implementations, one or more of the additional query parameters 264 may be stored on a cache of the search server 300, such that the additional query parameter 264 can be looked up upon receipt of the query wrapper 260. The search server 300 can use one or more of the query parameters 262, 264 included in the query wrapper 260 to generate the search results 360.

The search application 214 may be implemented as a client web application (e.g., a web browser), a native application, and/or a part of the operating system. A "native application" is an application that is executed, at least in part, by the processing device of a remote computing device 200. A "web application" is an application that is executed, at least in part, by a web server 130 and accessed by a remote computing device 200 via a web browser of the remote computing device 200. In some examples, a search application 214 is an application that the party associated or affiliated with the search server 300 develops to provide remote user computing devices 200 access to the search capabilities of the search server 300.

In some implementations, the search application 214 is configured to communicate with a partner device 140. The partner device 140 receives query parameters 262, 264 from a remote computing device 200, which the partner device 140 provides to the search server 300. The search server 300 provides the search results 360 to the partner device 140. The partner device 140 can communicate the search results 360 to the remote computing device 200. The partner device 140 may further process the search results 360 or add content to the search results 360 (e.g., advertisements, visual indicators, and/or additional result objects 362).

The search server 300 receives the search query 262 and/or the other query parameters 264 and determines a set of search results 360 corresponding to the search query 262 and/or the other query parameters 264. The search results 360 can include one or more result objects 362. A result object 362 can refer to data that is provided to the remote computing device 200 that can be displayed by the remote computing device 200. A result object 362 corresponding to a third party application can include one or more state links 364 to a state of the third party application, one or more visual indicators 366 corresponding to the third party application (e.g., an icon of the third party application, a logo or image of an entity corresponding to the state of the third party application, and/or a screen shot of the third party application), and other data 368 corresponding to the third party application (e.g., rankings, ratings, and/or descriptions corresponding to the third party application and/or the entity corresponding to the state of the third party application).

A state link 364 can refer to an object that includes text and/or images that a user may select (e.g., touch) via a user interface of the remote computing device 200. The remote computer device 200 displays the state link 364 and in some implementations, renders the state link 364. Each user selectable state link 364 may include one or more resource identifiers 365 for accessing a specific state of a third party application. A resource identifier 365 is a string of letters, numbers, and/or characters that can reference a particular state of the third party application. Types of resource identifiers include web resource identifiers 365a and application resource identifiers 365b. Web resource identifiers 365a (e.g., URLs) can be used to access states of web applications. A web resource identifier 365a can include a reference to a domain of a web server 130 that serves the web application and one or more state parameters that the web server 130 uses to access a particular state of the application. Application resource identifiers 365*b* can be used to access states of native applications. An application resource identifier 365*b* can include a reference to a native application to be launched by the remote computing device 200 and one or more state parameters that can be used by the remote computing device 200 to access a particular state of the application.

A state link 364 can include one or more application resource identifiers 365*b* and a web resource identifier 365*a*, such that when a user selects a state link 364, the remote computing device 200 can launch a native application to a state referenced in the application resource identifier 365*b* and/or access a web application at a state indicated by the web resource identifier 365*a*. The text and/or images of a state link 364 displayed to a user may indicate the state of the application that will be accessed in response to selection of the state link 364. For example, if the state link 364 is to a song in a music playing application, the text and/or images may identify the song that will be played by the music playing application when the user selects the state link 364.

In the example of FIG. 1B, the user has entered the search query "Late Night Diners." In response to the search query 262 and possibly one or more additional parameters 264 (e.g., geo-location of the remote computing device 200, operating system type, username, list of native applications installed on the remote computing device, and/or language preferences of the user), the search server 300 returns search results 360 that include a first result object 362*a* corresponding to the YELP® application. The YELP® application is an application that provides crowd-sourced reviews and ratings of various establishments as well as information specific to the establishments (e.g., hours of operation, contact information, and location). Each establishment may have an entry within the application, whereby users can view the ratings, reviews, and any other information regarding the establishment by searching for the establishment or by location. The result object 362*a* includes state links 364 to three different states of the YELP® native application. The state links 364 include a first state link 364*a* to a state corresponding to a first entry for an INTERNATIONAL HOUSE OF PANCAKES® restaurant or IHOP®, a second state link 364*b* to the state corresponding to a second entry for a DENNY'S® restaurant, and a third state link 364*c* to a state corresponding to a third entry for a TACO BELL® restaurant. Each state link 364 can include one or more resource identifiers 365 that allow the remote computing device 200 to access the YELP® application at a state indicated by the one or more resource identifiers 365. For example, the state link 364*a* corresponding to IHOP® can include one or more application resource identifiers 365*b*, whereby each application resource identifier 365*b* corresponds to a different native application version of the YELP® application (e.g., an iOS version and an ANDROID® version), but correspond to the same state (e.g., an entry for the IHOP® restaurant). The state link 364*a* can also include a web resource identifier 365*a* that corresponds to a web application version of the YELP® application and corresponds to the same state (e.g., the entry for the IHOP® restaurant).

The user can select (e.g., press or touch) one of the state links 364, and in response to the selection, the remote computing device 200 can access the state indicated by resource identifiers 365 embedded in the state link 364. In some scenarios, the remote computing device 200 can launch a native application indicated by an application resource identifier 365*b* embedded in the state link 364 at the state indicated by the application resource identifier 365*b*. For example, if the user selects the first state link 364*a*, the remote computing device 200 can attempt to launch the YELP® native application and access an entry for an IHOP® indicated by the state link (e.g., an entry for an IHOP® restaurant located near the geo-location of the remote computing device 200) using an application resource identifier 365*b* embedded in the state link 364*a*. If the remote computing device 200 is unable to launch the YELP® native application (e.g., the native application is not installed on the remote computing device 200), the remote computing device 200 can access the YELP® web application via a web browser application of the remote computing device 200 using the web resource identifier 365*a* embedded in the state link 364*a*. The search results 360 of FIG. 1B and the manner by which the search results 360 are displayed are provided for example only.

In operation, the search server 300 receives the search query 262 and/or the query parameters 264 and identifies one or more third party applications that are relevant to the search query 262 and/or the query parameters 264. The search server 300 generates resource identifiers 365 to specific states of the third party applications which are likely relevant to the search query 262 and/or the query parameters 264. The state links 364 included in a result object 362 are based on the resource identifiers 365 that are generated by the search server 300.

A third party application can refer to an application developed by a party that is unaffiliated with the search server 300. In some implementations, the third party application can include one or more native applications and one or more web applications which all provide the same or similar functionality. For example, a third party application for a music player that allows users to share playlists and song recommendations may include a "pay" version of the native application for the APPLE® iOS operating system, a "free" version of the native application for the APPLE® iOS operating system, a "pay" version of the native application for the ANDROID® operating system, and a "free" version of the native application for the ANDROID® operating system. The third party application may also include a mobile web application and a full-version web application that can be accessed by a web browser on a mobile remote computing device 200*a* and/or a desktop remote computing device 200*c*. All of the different versions may have overlapping functions and may be classified under the third party application.

The search server 300 can parse and process the query wrapper 260 to identify third party applications that are relevant to the query parameters 262, 264. As discussed herein, the search query 262 may include query terms that identify or otherwise implicate a name of a third party application, a desired functionality, or an entity. The search server 300 can perform one or more types of searches to determine a set of third party applications based on the query parameters 262, 264. For example, if the search server 300 receives the query "make a reservation at French Laundry at 7:00 PM," the search server 300 can identify that "French Laundry" has an entity type of restaurant and process the rest of the query terms to determine that the user desires functionality that allows the user to make reservations. The search server 300 can then identify a set of third party applications that can be utilized to make restaurant reservations.

In some implementations, the search server 300 is configured to forward one or more of the query parameters 262, 264 to a server associated with the third party application. More specifically, the search server 300 can transmit the one or more of the query parameters 262, 264 to a server associated with the third party application to leverage a specific functionality of the third party application. A functionality of a third party application can refer to a particular task that the third party application is configured to perform or particular information that the third party application is configured to provide. For example, a functionality of a third party application may be to provide geo-coordinates on a map, to search for a particular song in a music library of a third party application, to find the price of, and book, an airline ticket to a destination from a source location, or to search for reviews of near-by restaurants. Thus, if the third party application is a review application that is centered around a searching platform (e.g., the third party application returns information and crowd-sourced reviews for various establishments), the search server 300 may provide one or more of the query parameters 262, 264 to a web server 130 or application server 120 of the review application to receive reviews corresponding to the one or more query parameters 262, 264. The search server 300 can forward the query parameters 262, 264 to leverage the functionality of a third party application using a schema implemented by the third party to implicate the functionalities thereof.

Once the search server 300 has determined a set of third party applications that are relevant to the query 262, the search server 300 can generate requests according to each third party application's schema, which it can send to each respective third party application (e.g., a web server 130 or an application server 120). The third party application can provide a response to the request to the search server 300. The response can include the information indicating the requested data (e.g., one or more webpages showing search results), one or more resource identifiers 365 indicating where the requested data can be accessed, and/or one or more state parameters that respectively indicate one or more states of the third party application where the requested data can be accessed. In this way, the indicated state can be accessed at a later time without having to repeat the query. As used herein, the state of a third party application can refer to a particular page or screen of the third party application (e.g., a particular page of a web application or a particular screen of a native application). Further, the state of the third party application may be dependent on a set of state parameters. For instance, if a third party application displays search results for a particular set of query terms, the state of the third party application is a function, at least in part, of the query terms. Thus, a state of a web application can be referenced by a domain name of the web application and the state parameters that correspond to the particular state. A state of a native application can be accessed using the name of the third-party application and the state parameters corresponding to the state.

In some implementations, the search server 300 is further configured to provide a post execution view of a state of third party applications. In some implementations, the post execution view is a screen shot of either a native application or a web application at the state. The screen shot can be provided with the state link 364 in the result object 362, such that a user can see the state of the third party application. In some implementations, the post-execution view is a graphical user interface 250 that is displayed to the user, such that the user can access the specific functionality defined in the state.

Figure 2:
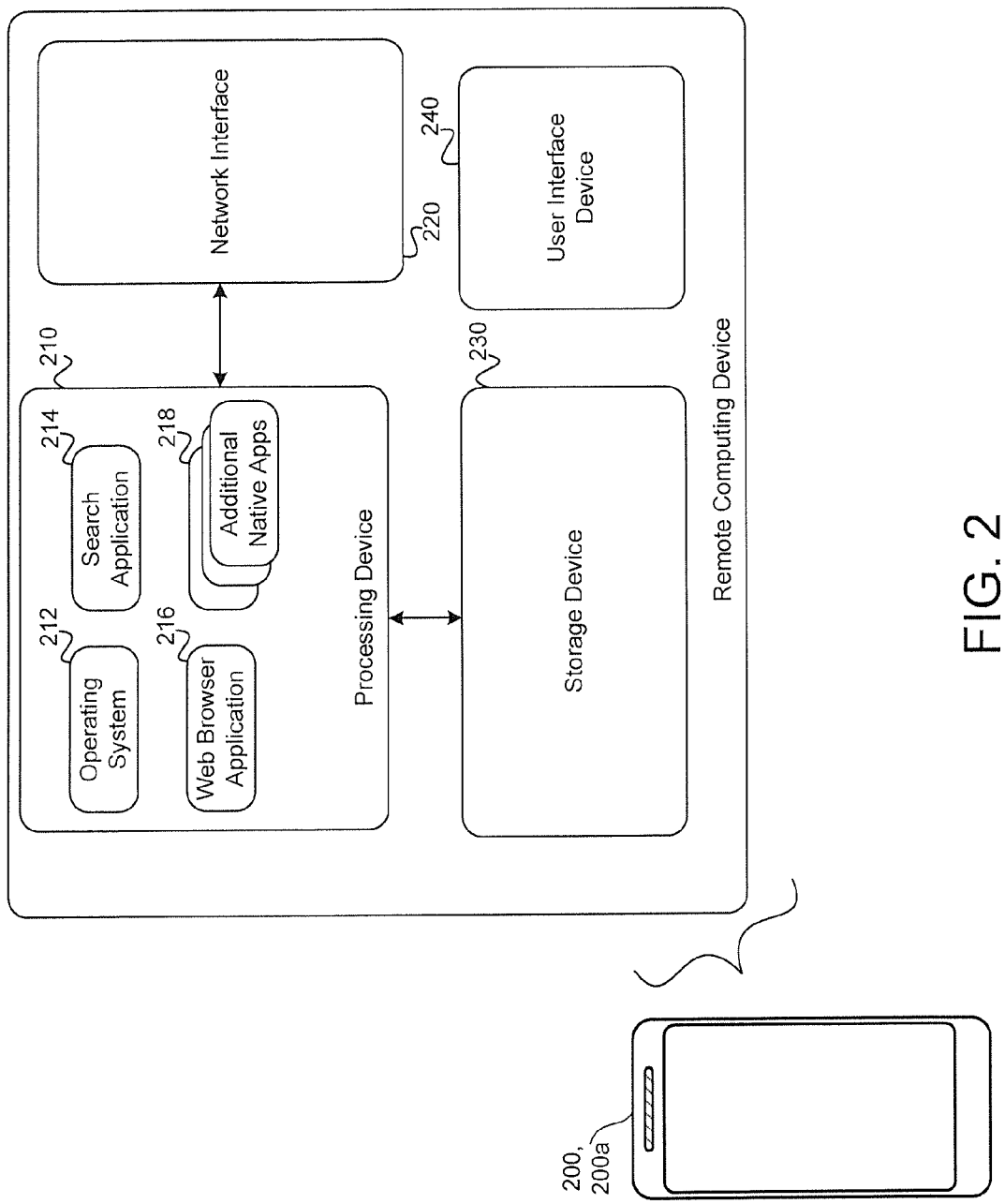
FIG. 2 illustrates an example set of components of the remote computing device.

FIG. 2 illustrates an example set of components of a remote computing device 200. The remote computing device 200 can include a processing device 210, a network interface 220, a storage device 230, and a user interface device 240. The remote computing device 200 can include additional components not depicted in FIG. 2 (e.g., accelerometer, sensors, GPS module).

The processing device 210 includes memory (e.g., RAM and/or ROM) that stores computer readable instructions and one or more processors that execute the computer readable instructions. In implementations where the processing device 210 includes more than one processor, the processors can execute in a distributed or individual manner. The processing device can execute an operating system 212, a search application 214, a web browser application 216, and one or more other native applications 218. The operating system 212 acts as an interface between higher level applications 214, 216, 218 and the processing device 210.

The network interface 220 includes one or more devices that are configured to communicate with the network 110. The network interface 220 can include one or more transceivers for performing wired or wireless communication. Examples of the network interface 220 can include, but are not limited to, a transceiver configured to perform cellular communications (e.g., transmission using the third generation (3G) or fourth generation (4G) telecommunications standards), a transceiver configured to perform communications using the IEEE 802.11 wireless standard, an Ethernet port, a wireless transmitter, and a universal serial bus (USB) port.

The storage device 230 can include one or more computer readable mediums that store data. The storage device 230 can store some or all of the computer readable instructions that define the search application 214, the web browser application 216, and the one or more other native applications 218. The storage device 230 can store other data as well (e.g., media contents, application data, contacts, documents).

The user interface device 240 can include one or more devices that allow a user to interact with the remote computing device 200. The user interface device 240 can include one or more of, for example, a touchscreen, a QWERTY keyboard, a display device, speakers, a touchpad, and a microphone. The user interface device 240 receives input from the user and provides the input to the processing device 210. The user interface device 240 receives output from the processing device 210 and outputs the output to the user.

The web browser application 216 is an application that requests web data from a web browser and displays the data on the user interface device 240. The web browser application 216 can be used to access web applications. In some implementations, the web browser application 216 can access a specific state of a web application by accessing the web server 130 located in the domain portion of a web resource identifier 365*b* and providing a request to the web server 130 using the state parameters indicated in the path portion of the web resource identifier 365*b*. Web applications can provide any suitable functionality.

The native applications 218 are applications that are executed, in part, by the processing device 210. Native applications 218 can be developed by third parties and made available to consumers in a variety of manners. For instance, a user can download a native application to the remote computing device 200 from an application retail store (e.g., from GOOGLE PLAY® developed by Google Inc., the APP STORE® developed by Apple Inc.) or from a website associated with the third party. Additionally or alternatively, the user can load a native application into the storage device 230 of the remote computing device 200 from a removable media, such as a CD-ROM. Native applications 218 can provide any suitable functionality. Examples of native applications can include, but are not limited to, word processing applications, messaging applications, media streaming applications, social networking applications, e-reader applications, and games.

The search application 214 presents a graphical user interface 250 (GUI) that allows a user to enter a search query 262 and displays search results 360. In some implementations, the GUI 250 can display a search bar 252 whereby the user can provide text and/or speech input into the search bar 252. Additionally, or alternatively, the operating system 212 of the remote computing device 200 can display the search bar 252 on the home screen of the remote computing device 200, whereby a user can enter the search query 262 directly from the home screen. In these implementations, when the user enters the search query 262 into the search bar 252 displayed on the home screen and executes the search, the operating system 212 of the remote computing device 200 can launch the search application 214.

When the user executes a search query 262 (e.g., by pressing the search button 254), the search application 214 can generate a query wrapper 260 that contains the search query 262 and any other query parameters 264. The search application 214 can obtain the other query parameters 264 in any suitable manner. For example, the search application 214 can obtain information regarding the device (e.g., device type, operating system type, operating system version) from a file in the storage device 230 or in the memory of the processing device 210. Additionally or alternatively, the search application 214 can obtain information regarding the device from a sensor or component of the remote computing device 200 (e.g., the geo-location can be obtained from a GPS module of the remote computing device 200). The search application 214 can create a query wrapper 260 based on the provided search query 262 and the obtained query parameters 264.

The search application 214 transmits the query wrapper 260 to the search server 300, which responds with the search results 360. The search application 214 displays the search results 360 in the GUI 250 of the search application 214. As previously discussed, the search application 214 can display state links 364 to access resources that are relevant to the query parameters 262, 264. The state links 364 can include application resource identifiers 365b that can be used to launch a third party application and access a specific state within the third party application. When the user selects a state link 364, the search application 214 can initiate the accessing of the third party application at the specific state. In some implementations, the search application 214 attempts to launch a native application 218 version of a third party application. To initiate launching the native application 218 to the specific state, the search application 214 provides an instruction to launch the third party application to the operating system 212 using the information provided in the state link 364. The operating system 212 can attempt to launch a native application 218 indicated by an application resource identifier 365b in the state link 364, and if unsuccessful, can attempt to access the third party application via the web browser application 216 (i.e., leverage the web application version of the third party application).

Figure 3:
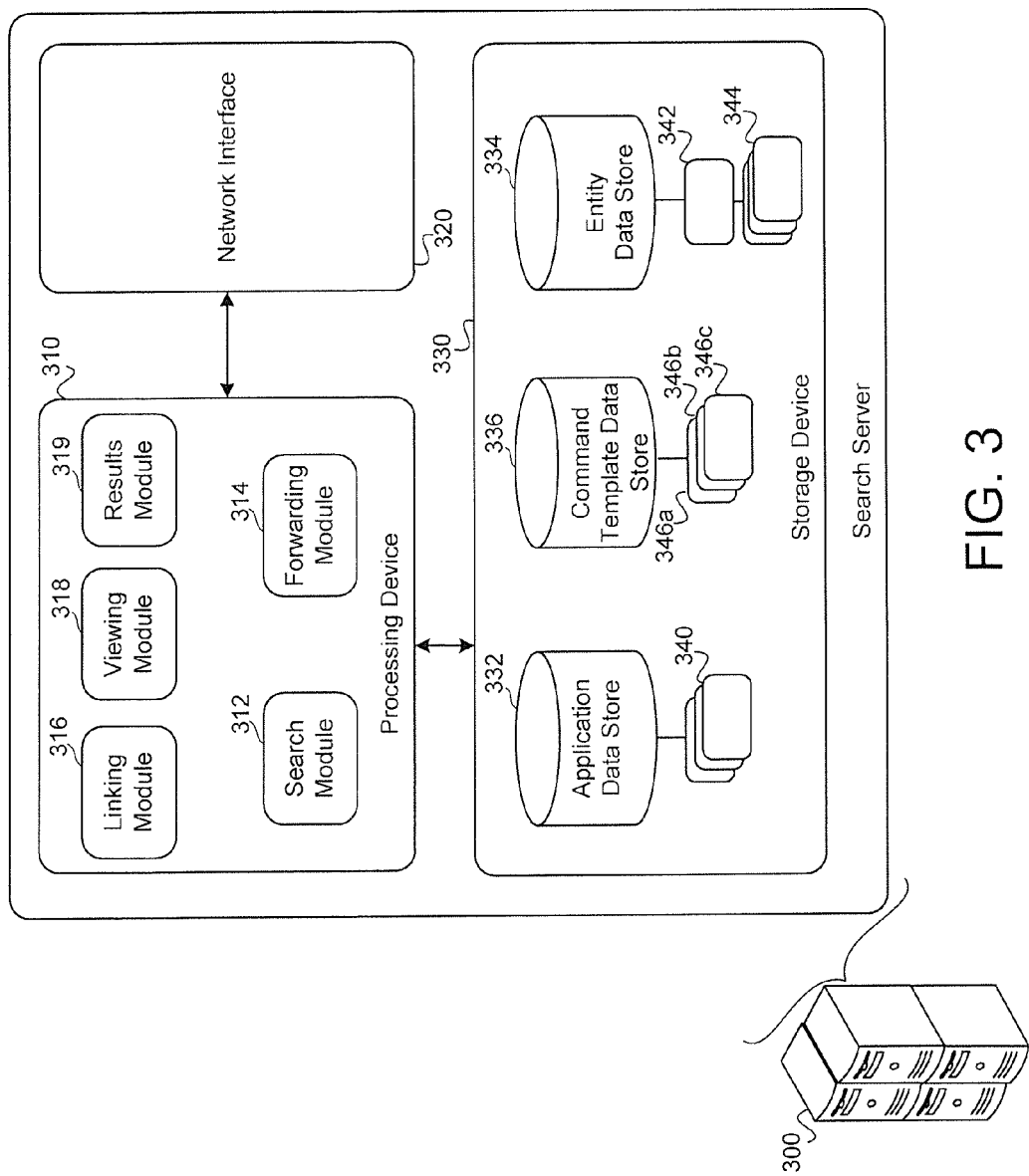
FIG. 3 illustrates an example set of components of the search server.

FIG. 3 illustrates an example set of components of the search server 300. The search server 300 can include a processing device 310, a network interface 320, and a storage device 330. The search server 300 may include additional components not explicitly shown in FIG. 3. The search server 300 can be implemented as a single device or a collection of devices (e.g., rack mounted servers). The search server 300 may be located at a single location (e.g., at a single data center) or at multiple locations (e.g., multiple data centers).

The processing device 310 includes memory (e.g., RAM and/or ROM) that stores computer readable instructions and one or more processors that execute the computer readable instructions. In implementations where the processing device 310 includes more than one processor, the processors can execute in a distributed or individual manner. The processing device can execute one or more of a search module 312, a forwarding module 314, a linking module 316, a viewing module 318 and a results module 319. The processing device 310 may further execute an operating system (not shown) that acts as an interface between the one or more modules 312, 314, 316, 318, 319 and the processing device 310.

The network interface 320 includes one or more devices that can perform wired and/or wireless (e.g., WiFi or cellular) communication. Examples of the network interface device 320 include, but are not limited to, a transceiver configured to perform communications using the IEEE 802.11 wireless standard, an Ethernet port, a wireless transmitter, and a universal serial bus (USB) port.

The storage device 330 can include one or more computer readable mediums that store data. The storage device 330 can store some or all of the computer readable instructions and other suitable data. In some implementations, the storage device stores one or more of an application data store 332, an entity data store 334, and a command template data store 336.

The application data store 332 may include one or more databases, indices (e.g., inverted indices), files, or other data structures storing this data. The application data store 332 includes application data of different third party applications. The application data of an application may include one or more of keywords associated with the application, reviews associated with the application, the name of the developer of the application, the platform of the application, the price of the application, application statistics (e.g., a number of downloads of the application and/or a number of ratings of the application), a category of the application, and other information. The application data store 332 may include metadata for a variety of different applications available on a variety of different operating systems. The search module 312 may retrieve and analyze the application data from the application data store 332 in order to perform application searches and to provide search results 360.

In some implementations, the application data store 332 stores the application data in application records 340. Each application record 340 can correspond to a third party application and may include the application data pertaining to the third party application. An example application record 340 includes an application name, an application identifier, and other application features. The application record 340 may generally represent the application data stored in the application data store 332 that is related to the third party application.

The application name may be the name of the third party application represented by the data in the application record 340. Example application names may include "FACEBOOK®," "TWITTER®," "MICROSOFT® Word," or "ANGRY BIRDS®." The application identifier (hereinafter "application ID") identifies the application record 340 amongst the other application records 340 included in the application data store 332. In some implementations, the application ID may uniquely identify the application record 340. The application ID may be a string of alphabetic, numeric, and/or symbolic characters (e.g., punctuation marks) that uniquely identify the third party application represented by the application record 340. In some implementations, the application ID is the ID assigned to the application by a retail site (e.g., APP STORE® or GOOGLE PLAY®) that offers the application. In other implementations, the search server 300 assigns application IDs to each third party application when creating an application record 340 for the third party application.

The application features of a third party application may include any type of data that may be associated with the third application represented by the application record 340. The application features may include a variety of different types of metadata. For example, the application features may include structured, semi-structured, and/or unstructured data. The application features may include information that is extracted or inferred from documents retrieved from other data sources (e.g., application retails sites, application developers, blogs, and reviews of applications) or that is manually generated (e.g., entered by a human).

The application features may include the name of the developer of the application, a category (e.g., genre) of the application, a description of the application (e.g., a description provided by the developer), a version of the application, the operating system the application is configured for, and the price of the application. The application features further include feedback units provided to the application. Feedback units can include ratings provided by reviewers of the application (e.g., four out of five stars) and/or textual reviews (e.g., "This app is great"). The application features can also include application statistics. Application statistics may refer to numerical data related to the application. For example, application statistics may include, but are not limited to, a number of downloads, a download rate (e.g., downloads per month), and/or a number of feedback units (e.g., a number of ratings and/or a number of reviews). The application features may also include information retrieved from websites, such as comments associated with the application, articles associated with the application (e.g., wiki articles), or other information. The application features may also include digital media related to the application, such as images (e.g., icons associated with the application and/or screenshots of the application) or videos (e.g., a sample video of the application).

In some implementations, an application record 340 can group one or more application editions under a canonical application structure. The term canonical application structure can refer to a group of similar application editions. Put another way, the canonical application structure may be a representative or umbrella under which the one or more application editions are organized. Each application edition in a group of application editions that are organized under the same canonical application structure respectively indicates a version of a third party application that is functionally similar to other versions of the third party application editions organized under the canonical application structure. In other words, the application editions can represent different versions of the same third party application. Examples of edition applications are different release versions of an application (e.g., beta, 1.0, or 2.0), different language versions of an application (e.g., English, Russian, or Chinese), different platform versions of an application (e.g., iOS or ANDROID®), different functional characteristics (e.g., a light version, an advanced user version), different aesthetic characteristics (e.g., a holiday themed version), and different resolution versions of an application (e.g., standard definition or high definition). Third party applications which are related but not similar (e.g., sequels in a series of games or a different release of a serial application) are typically not classified under the same canonical application. For example, ANGRY BIRDS® may be a separate canonical application from ANGRY BIRDS® STAR WARS®. Although the applications may have a same underlying concept, they are treated as separate games (i.e., third party applications).

The entity data store 334 may include one or more databases, indices (e.g., inverted indices), files, or other data structures. The entity data store 334 stores one or more entity indexes 342. Each entity index 342 indexes a plurality of entity records 344. Each entity record 344 has an entity type. An entity type defines one of a plurality of various categories that are referenced in the entity data store 334. Non-limiting examples of entity types include "airport," "movie," "TV show," "actor," "musician," "band," "song," "album," "restaurant," "city," "country," 'person," "medicine," "symptom," and "time." Each entity record 344 represents a different entity. Each entity represents a species of a specific entity type. For example, the term "Toy Story" may be of the entity type "movie," MCDONALDS® may be of the entity type "restaurant" and/or "fast food restaurant," and "the Beatles" may be of an entity type "band." In some implementations, each entity type has a corresponding entity index 342. An entity data store 334 can be built off-line and/or can be continuously updated. In some examples, the entity index 342 is human curated, which may use existing data sources, such as FREEBASE® or WIKIPEDIA® to build the entity data store 334. Curators can define the entity types manually and the data sources may be crawled to index all the various entities. Each entity type may have a particular record format corresponding thereto. For example, an entity record 344 for a restaurant entity may be: {entityTypeId:1, typeName:"Restaurant", fields: ["name", "foodType"]}. In this case, restaurant is an entity type name. The entity data store 334 may further include an application configuration database (not shown) that contains an application reference record for each entity-supporting application (e.g., third party applications). Each application reference record includes a name or application ID of a third party application and which entity type or types that a particular third party application supports. For example, an application reference record corresponding to IMDB® (Internet Movie Database) may support movie entities, TV show entities, and actor entities. Similarly, an application reference record for the YELP® application may support restaurant entities, retail store entities, or other establishment related entities.

The command template data store 336 stores a plurality of command templates 346 for different third party applications. A command template 346 may be a template defining a manner by which one or more state parameters are accepted by a third party application. In some implementations, the command templates 346 for a third party application include request command templates 346*c* that are used to generate requests that are sent to servers associated with third party applications. A request can refer to a communication that is provided to a resource (e.g., a web server 130 or application server 120) requesting a particular function. Additionally or alternatively, the command templates 346 for a third party application can include command templates 346*a*, 346*b* for generating resource identifiers 365. The command templates 346 can be human curated or provided by the developer of the third party application. Furthermore, in some implementations, the command templates 346 implemented by a third party application can be determined by parsing and analyzing the code of a third party application (e.g., the HTML code of the web application) to identify the schema implemented by the third party application and the various parameters that are accepted by the third party application.

According to some implementations, a web application command template 346a of a particular third party application is a template for generating a web resource identifier 365a to access a particular state or states of a web application (e.g., a URL). In some implementations, a web resource identifier 365a can indicate a domain name of a web server 130 that executes a web application version of a third party application and one or more state parameters that define a state of the web application. For example, a web resource identifier 365a may be a uniform resource locator (URL), such that a first portion of the URL is the domain name, and a second portion of the URL is a tail that indicates a path defining one or more state parameters that can be used to access a specified state of the web application. A web browser uses a web resource identifier 365a to access the state of the third party application indicated therein by sending a web request to the web server 130 referenced by the domain name, whereby the web request includes the state parameters arranged in a manner defined in the web application command templates 346a and/or schema. For example, a web request corresponding to the URL: "http://www.example.com/find?q=al+pacino&s=all" may be transmitted in an HTTP request to the server located at an address corresponding to www.example.com, and the state parameters can be included in the tail portion: "find?q=al+pacino&s=all." In this example, the response to the web resource identifier 365a would include a web page that shows search results (360) resulting from the query terms "Al Pacino." A web application command template 346a can define a domain name of the web server 130 of the web application (e.g., "www.domain.com") and a path that identifies parameter fields that receive parameters and the order by which parameters are accepted by the webserver 130 (e.g., "/<param_type_1>&<param_type_2>", where param_type_1 and param_type_2 are the types of parameters accepted by the web server 130 located at http://www.domain.com). Each web application can have one or more corresponding web command templates 346a. In another example, a web application command template 346a for a third party application may take the form: "http://www.domain.com/search?find_desc=<query_terms>&find_loc<loc>. In this example, the web command template 346a includes two parameter fields: <query_terms>, which takes search query terms; and <loc> which takes in a location (e.g., city, state, and/or country).

According to some implementations, a native application command template 346b of a particular third party application is a template for generating an application resource identifier 365b. An application resource identifier 365b is a string of letters, numbers, and/or characters that corresponds to a state of a native application 218. A native application 218 can parse an application resource identifier 365b to provide access to a state of the application. The application resource identifier 365b identifies the native application 218. In some scenarios, the application resource identifier 365b includes one or more state parameters that correspond to the state of the application. The one or more state parameters can be used by the native application 218 to access the state. An application resource identifier 365b can instruct the operating system 212 of a remote computing device 200 to launch a native application 218 based on a domain portion of the application resource identifier 365b that references the native application 218 and to access a particular state of the native application 218 based on a tail portion that includes one or more state parameters that define a state of the native application 218. When an application resource identifier 365b is selected by a user of a remote computing device 200, the remote computing device 200 launches the application and accesses the state therein. A native application command template 346b can include a domain portion that identifies the native application 218 (e.g., "example_app") and a tail portion that identifies parameter fields that receive parameters and the order by which parameters are accepted by the native application 218 and/or an application server 120 (e.g., "::<param_type_1>: <param_type_2">, where param_type_1 and param_type_2 are the types of parameters accepted by the native application 218 "example_app"). Each native application 218 can have one or more corresponding native application command templates 346b. In another example, a native application command template 346b for a third party native application may take the form: "example_app:: search?find_desc=<query_terms>&find_loc<loc>. In this example, the native application command template 346b includes two parameter fields: <query_terms>, which takes search query terms; and <loc> which takes in a location (e.g., city, state, and/or country).

The command template data store 336 may further store an association table for each third party application having command templates 346 stored in the command template data store 336. An association table of a third party application can associate the different entity types that are stored in the entity data store 334 with the parameter fields that the third party application accepts. For example, if a third party application receives a location and a restaurant entities query in the form of <loc> and <rest_name>, respectively, the association table may associate location entities to <loc> and restaurant entities to <rest_name>.

In operation, the search module 312 receives query parameters 262, 264 and identifies a set of third party applications corresponding to the query parameters 262, 264. The search module 312 is configured to perform any type of suitable search. In some implementations, the search module 312 can perform one or more of a functional search, an entity search, and a name search.

A functional search is a search for applications providing a particular functionality. Functional searching is different than name searching or keyword searching in that functional searching usually aims to identify applications that provide a desired task, function, or feature (e.g., find restaurant, take me to downtown, where to find the best burger) instead of specific keywords. For example, a functional search term may be "make video calls to friends oversees," compared to a name search of "SKYPE®." In this example, the query does not include the term "SKYPE®," and the description of the SKYPE® application does not mention the word "friends" or "overseas." Therefore, traditional keyword searches might not identify the SKYPE® application as being relevant. As the SKYPE® application allows users to place video and voice calls across the world, a functional search would likely identify the SKYPE® application in response to the "make video calls to friends overseas" query parameter 262.

Functional searching may include searching for a third party application across multiple platforms or constrained to certain platforms (e.g., ANDROID® only). By way of example, in one embodiment a platform can be a hardware architecture and/or software framework, the combination of which allows the software to run. Some examples of platforms include, but are not limited to, ANDROID®, BLACKBERRY® OS, MICROSOFT WINDOWS® Mobile, APPLE MAC OS®, APPLE iOS®. Functional searching can be supported by the application data store 332. The application data store 332 includes data from multiple third party sources such as, but not limited to, blogs, application review sites, application catalogs, and/or application developers. Due to the different sources included in the functional database, functional searching leverages the multiple data sources and analyzes both the textual and non-textual features and provides the user with a list of the best available applications based on his/her inputted query terms. The application data store 332 merges the information that it gathers from the different sources and combines the information based on different version or editions of the same application, providing a more comprehensive analysis. The application data store 332 is indexed for faster retrieval of the data entries.

Operationally, the search module 312 can receive a query wrapper 260 from a remote computing device 200. The search module 312 can process the query parameters 262, 264 contained in the query wrapper 260. The search module 312 may perform various processing operations on the query parameters 262, 264. For example, analysis operations performed by the search module 312 may include, but are not limited to, tokenization of the query parameters 262, 264, filtering of the query parameters 262, 264, stemming the search query 262, synonomyzation of the query parameters 262, 264, and stop word removal. In some implementations, the search module 312 may further generate one or more subqueries based on the query parameters 262, 264. Subqueries are search queries that are based on some subcombination of the search query 262 and the other query parameters 264.

The search module 312 identifies a consideration set of applications (e.g., a list of applications) based on the query parameters 262, 264 and, in some implementations, the subqueries. In some examples, the search module 312 may identify the consideration set by identifying applications that correspond to the query parameters 262, 264 or the subqueries based on matches between terms in the query parameters 262, 264 (and/or the subqueries) and terms in the application data of the application (e.g., in the application record 262 of the application). For example, the search module 312 may identify one or more applications represented in the application data store 332 based on matches between terms or tokens representing the query parameters 262, 264 and terms or tokens included in the application records 340 of those applications. The consideration set may include a list of application IDs and/or a list of application names.

The search module 312 performs a variety of different processing operations on the consideration set. In some implementations, the search module 312 may generate a result score for each of the applications included in the consideration set. In some examples, the search module 312 may cull the consideration set based on the result scores of the applications contained therein. For example, the subset may be those applications having the greatest result scores or have result scores that exceed a threshold. The result objects 362 included in the search results 360 may depend on how the search module 312 calculates the result scores. For example, the result scores may depend on any combination of the relevance of an application to the query parameters 262, 264, the popularity of an application in the marketplace, the ratings of an application, and other properties of the application.

The search module 312 may generate result scores for applications in a variety of different ways. In general, the search module 312 may generate a result score for an application based on one or more scoring features. The scoring features may be associated with the application and/or the query parameters 262, 264. An application scoring feature may include any data associated with an application. For example, application scoring features may include any of the application features included in the application record 340 or any additional features related to the application, such as data indicating the popularity of an application (e.g., number of downloads) and the ratings (e.g., number of stars) associated with an application. A query scoring feature may include any data associated with the query parameters 262, 264. For example, query scoring features may include, but are not limited to, a number of terms in the search query 262, the popularity of the search query 262, and the expected frequency of the terms in the search query 262. An application-query scoring feature may include any data, which may be generated based on data associated with both the application and the query parameters 262, 264 (e.g., the query parameters 262, 264 that resulted in identification of the application record 340 by the search module 312). For example, application-query scoring features may include, but are not limited to, parameters that indicate how well the terms of the query match the terms of the identified application record 340. The search module 312 may generate a result score for an application based on at least one of the application scoring features, the query scoring features, and the application-query scoring features.

The search module 312 may determine a result score based on one or more of the scoring features listed herein and/or additional scoring features not explicitly listed. In some examples, the search module 312 may include one or more machine learned models (e.g., a supervised learning model) configured to receive one or more scoring features. The one or more machine learned models may generate result scores based on at least one of the application scoring features, the query scoring features, and the application-query scoring features. For example, the search module 312 may pair the query parameters 262, 264 with each application and calculate a vector of features for each (query, application) pair. The vector of features may include application scoring features, query scoring features, and application-query scoring features. The search module 312 may then input the vector of features into a machine-learned regression model to calculate a result score that may be used to rank the applications in the consideration set. The search module 312 can then rank the applications indicated in the consideration set based on the result scores. Additionally or alternatively, the search module 312 can cull the applications indicated in the consideration set based on the result scores. The output of the functional search is a set of third party applications based on the consideration set. The foregoing is an example of how a result score is calculated. Some implementations may calculate the result score in a different manner.

Additionally or alternatively, the search module 312 executes an entity search. An entity search is a search that attempts to identify the types of entities referenced in a query, and in some cases, to identify third party applications that are relevant to those entities. The search module 312 can include the results of the entity search in the set of third party applications and/or can utilize the results to enhance the results produced by the functional search. Entity searches are supported by the entity data store 334.

In operation, the search module 312 receives the query parameters 262, 264 and initiates an entity search. The search module 312 provides a database request to the entity data store 334 that includes one or more of the terms of the query parameters 262, 264. When one or more terms are listed in the entity data store 334, the entity data store 334 returns the entity types of the matched terms. The search module 312 can then determine which third party applications are relevant to the returned entity types based on the application reference records. The search module 312 may be further configured to score each entity type/third party application match by estimating a probability of whether the entity match is a good match. The search module 312 can use heuristic techniques to score the entity type/third party application match. The search module 312 can rank the matched applications based on the calculated scores. The matched applications can be included in the set of third party applications. Additionally or alternatively, once the search module 312 has scored the applications, the results (e.g., list of applications and corresponding scores) of the entity search can be provided as a signal to the functional search process. In these implementations, the functional search process can use the entity search results (360) as a signal for determining the results scores of the applications in the consideration set.

In an example of an entity search, the query parameters 262, 264 may contain the terms "Toy Story." The search module 312 can identify "Toy Story" in the entity data store 334, which can be associated with one or more entity types. For example, "Toy Story" may be identified as a movie entity. The search module 312 can then identify third party applications that are related to movie entities. In this example, the search module 312 can identify the IMDB® application, the NETFLIX® application, and the ROTTEN TOMATOES® application as third party applications that support movie entities. Thus, these third party applications may be indicated in the set of third party applications and/or may be used to calculate the result scores of applications indicated in the consideration set identified during the functional search process.

In some implementations, the search module 312 can store identified entities in the query parameters 262, 264 for later use. In these implementations, the stored entities can be used to send requests to a web server 130 or application server 120 or to generate one or more resource identifiers 365.

In some implementations, the search module 312 is further configured to perform name searches. A name search is a search for third party applications having a name that is explicitly included in the query terms. The search module 312 can determine whether any of the terms in the search query 262 match to a name of an application represented in the application data store 332. If so, the search module 312 can include the third party application defined by the application representation to the set of third party applications. The foregoing search techniques are provided for example only.

The forwarding module 314 is configured to forward one or more of the query parameters 262, 264 to servers of the third party applications identified by the search module 312. In some implementations, the forwarding module 314 determines a web server 130 and/or an application server 120 associated with each third party application. In these implementations, the forwarding module 314 can obtain a request command template 346c corresponding to the third party application for transmitting a request to the web server 130 and/or the application server 120. The forwarding module 314 can obtain the request command templates 346c of the third party application from the command template data store 336. Based on the request command template 346c and the one or more query parameters 262, 264, the forwarding module 314 formats an outgoing request. The request command template 346c can be based on the schema which is implemented by a particular third party application to receive and process requests. Each third party application may accept different parameter types and different syntaxes for expressing parameters in requests that are provided to the third party application. Thus, a schema implemented by a third party application can define how it expects to receive requests, whereby each command template can be defined to leverage a specific functionality of the third party application.

The forwarding module 314 can generate an outgoing request by inserting one or more of the query parameters 262, 264 that were extracted from the query wrapper 260 into the command template 346c. As discussed, the search module 312 can determine the entity type of at least a subset of the query parameters 262, 264. Furthermore, by identifying the command templates 346c of a particular third party application, the forwarding module 314 can understand the parameter types that are included in each particular command template 346c of the third party application. The forwarding module 314 can utilize an association table between entity types and parameter types to determine which query parameters to include in the outgoing request. For instance, a third party application for making restaurant reservations may accept the following command template: "http://www.ex_res_app.com/ex.aspx?d=<date>&t=<time>&r=<name>" and the query may have included the following query terms: "French Laundry," the current date, and "9:00 P.M." In this example, the search module 312 determines that "French Laundry" is most likely a restaurant entity, the current date is likely a date entity, and "9:00 P.M." is most likely a time entity. Thus, the forwarding module 314 can generate the request URL "http://www.ex_res_app.com/ex.aspx?d=<FEB28>&t=<2100>&r=<French_Laundry>" based on the command template 346c referenced above. The forwarding module 314 can transmit the request to the web server 130 (or application server 120) corresponding to the third party application. In this way, the forwarding module 314 leverages the reservation making functionality of the third party application. While a request URL is shown in the example above, the request may have any other suitable format, such as an API call to the server of the third party application.

The third party application processes the request, as it would any other request from a remote computing device 200, and returns a response corresponding to the request. For example, if the third party application is an online retailer that allows consumers to search for brands or types of clothing, the third party application may return a response indicating items of clothing that are sold by a retailer associated with the third party application, whereby the items indicated in the response correspond to the parameters included in the request.

The response from the third party application may include a resource identifier 365. For example, a web server 130 may respond to a web request. The response may include the requested data and web resource identifier 365a and/or an application resource identifier 365b that indicates where the requested data may be found. For example, if a third party application is an application for making restaurant reservations, a server of the third party application may receive a request indicating a restaurant name, a time, and a day. In response, the server 120, 130 may return a response indicating whether making a reservation is possible at the specified date and time and/or a resource identifier 365 (e.g., web resource identifier 365*a* or an application resource identifier 365*b*) to a state of the third party application that allows the user to make the reservation.

The linking module 316 receives responses from the third party applications (i.e., from web servers 130 and/or application servers 120 of the third party applications) and generates state links 364 to the third party applications based on the responses received from each respective third party application. The linking module 316 includes the state links 364 in the result objects 362 that are provided to the remote computing device 200 as part of the search results 360. In some implementations, the linking module 316 receives web resource identifiers 365*a* from web servers 130 associated with each of the third party applications. For each web resource identifier 365*a*, the linking module 316 can generate a state link 364 that includes one or more web resource identifiers 365*a* and/or one or more application resource identifiers 365*b*. The linking module 316 can be configured to convert a web resource identifier 365*a* to an application resource identifier 365*b*. For example, the linking module 316 may utilize conversion rules for converting from a web resource identifier 365*a* to an application resource identifier 365*b*. Conversion rules can be specific to specific third party applications (e.g., a first conversion rule may apply to a first third party application, while a second conversion rule can apply to a second third party application). A conversion rule can define how to convert a domain name in the web resource identifier 365*a* to a reference to a native application 218 that is included in the application resource identifier 365*b*. A conversion rule can further define how to convert the state parameters appearing in the web resource identifier 365*a* to the state parameters that are included in the application resource identifier 365*b*.

Additionally or alternatively, the linking module 316 can generate state links 364 to particular states of third party applications using one or more command templates corresponding to the third party applications indicated in the set of third party applications (identified by the search module 312), one or more of the terms contained in the query parameters 262, 264, and in some cases, one or more entities and entity types identified by the search module 312. In some implementations, the linking module 316 obtains the one or more command templates 346 from the command template data store 336 for each third party application indicated in the set of third party applications and, in some cases, the entity types determined by the search module 312. For example, for a third party application that allows a user to make restaurant reservations, the command templates 346 corresponding to the third party application may include command templates 346 for generating web resource identifiers 365*a* and application resource identifiers 365*b*. Each command template 346 may indicate the types of parameters it receives. Using an association table that associates entity types to parameter types accepted by the third party application, the linking module 316 determines which entities can be entered in which parameter fields in each command template 346. The linking module 316 then substitutes the identified entities for the parameter fields in the command templates 346. In this way, for each third party application identified in the set of third party applications, the linking module 316 can generate one or more web resource identifiers 365*a* and/or application resource identifiers 365*b* that leverage one or more functionalities of the third party application without having to send a request to a web server 130 or application server 120 of the third party application.

The linking module 316, for each set of resource identifiers 365 that correspond to a particular state, can imbed the set of resource identifiers 365 corresponding to a third party application in a state link 364. In implementations where the state link 364 includes more than one resource identifiers 365 (e.g., one or more application resource identifiers 365*b* and a web resource identifier 365*a*), the linking module 316 can further include an instruction set with the state link indicating an order to access the resource identifiers 365. For instance, the instruction set can instruct the remote computing device 200 to first attempt to launch the native application 218 indicated by an application resource identifier 365*b* and, if unsuccessful, to access the web application via the web browser of the remote user computing device 200. In some implementations, the instruction set is a script.

The viewing module 318 can determine a view of the state of the third party application, which can be provided to the remote computing device 200. A view of the state of a third party application can be, for example, a graphical user interface (GUI) 250 of either a native application version or a web application version of the third party application. In some implementations, the viewing module 318 can, for example, access the web application at the determined state and capture a screen shot of the graphical user interface 250 of the web application at the state. In these implementations, the viewing module 318 can provide the screen shot to the linking module 316, which provides the screen shot with the state link. In some implementations, the screen shot is only taken of a portion of the screen that corresponds to the functionality implicated by the query.

In some implementations, the viewing module 318 is configured to provide the remote computing device 200 access to the actual third party application (e.g., a native application version or a web application version of the third party application). In these implementations, the viewing module 318 analyzes the code of a web application or a native application 218 to identify a particular segment of the code that pertains to the desired function of a particular state of the application. The identified portion of the code can then be executed either at the web server 130, the search server 300, or at the remote computing device 200, to provide the user with a functionality that is implicated by the query. To support these implementations, the web application may be written in a programming language that segments behaviors (e.g., specific functions) and presentation related to the associated behavior in modular blocks. In this way, the viewing module 318 can efficiently identify a modular block corresponding to a specific functionality or state, such that the viewing module 318 can provide the one or more query parameters 262, 264 to the modular block, which is executed using the one or more query parameters 262, 264. This allows the remote computing device 200 to receive a view of a particular function of the web application or native application 218 at the desired state, and further, to interact with the web or native application 218 (e.g., provide additional input and/or receive additional output).

The results module 319 generates the search results 360 and provides the search results (360) to the remote computing device 200 that provided the query. For each third party application in the set of third party applications, the results module 319 can generate a result object 362 for the third party application. The result object 362 can include one or more state links 364 to different states of the third party application. As previously discussed, each state link 364 can include an application resource identifier 365b and/or a web resource identifier 365a. Additionally or alternatively, the results module 319 can obtain visual indicators 366 corresponding to the third party application and can include the visual indicators 366 in the result object 362. Examples of visual indicators 366 that can be included in a result object 362 of a third party application include, an icon of the third party application, a logo or image of an entity corresponding to the state of the third party application, and/or a screen shot of the third party application. Additionally or alternatively, the results module 319 can obtain other data 368 corresponding to the third party application and can include the other data 368 in the result object 362. Examples of other data 368 corresponding to the third party application can include rankings, ratings, and/or descriptions corresponding to the third party application and/or the entity corresponding to the state of the third party application. The results module 319 can combine the result objects 362 into the search results 360 and transmit the search results 360 to the remote computing device 200.

Figure 4A:
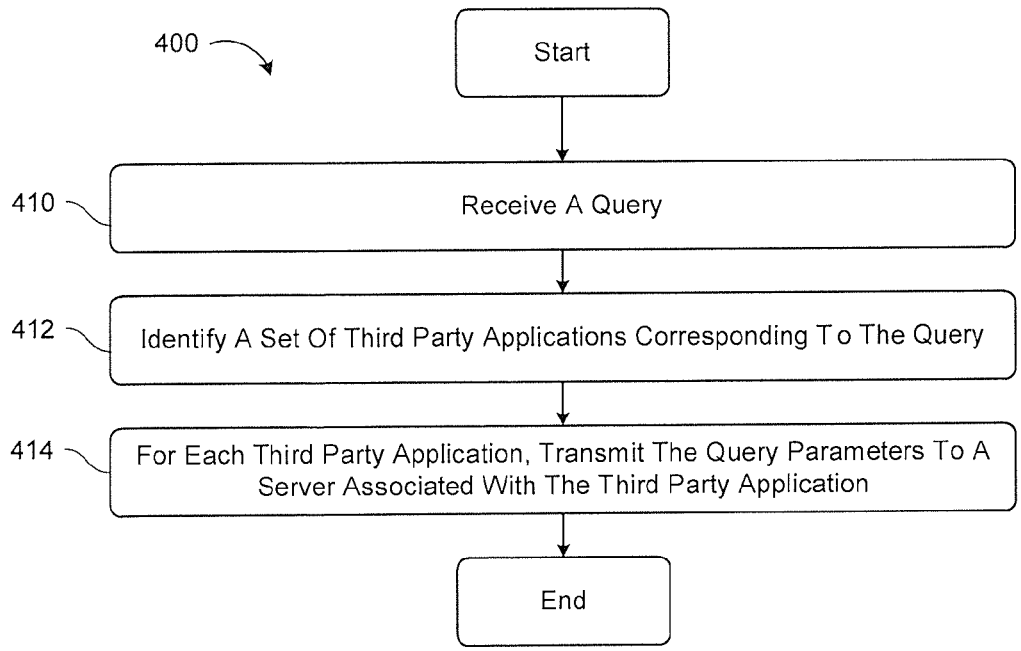
FIGS. 4A and 4B illustrate example sets of operations for a method for transmitting query parameters to servers associated with one or more third party applications.

FIG. 4A illustrates an example set of operations for a method 400 for providing parameters to one or more third party applications. For purposes of explanation, the method 400 is described as being performed by the components of the search server 300.

At operation 410, the search module 312 receives a query (e.g., query wrapper 260) from the remote computing device 200. In some implementations, the query may be provided from the remote computing device 200 via a partner device 140. As discussed, the query can include query parameters 262, 264, including a search query 262 and other parameters 264 such as the location of the remote computing device 200 and/or an operating system 212 of the remote computing device 200. The search module 312 parses the search query 262 to identify the query terms. Further, the search module 312 can perform natural language processing to extract features of the query terms. At operation 412, the search module 312 can identify a set of one or more third party applications which correspond to the query based on the query parameters 262, 264 and/or the features of the query terms. As previously discussed, the search module 312 can perform one or more of a functional search, an entity search, and a name search to identify the set of third party applications.

Figure 4B:
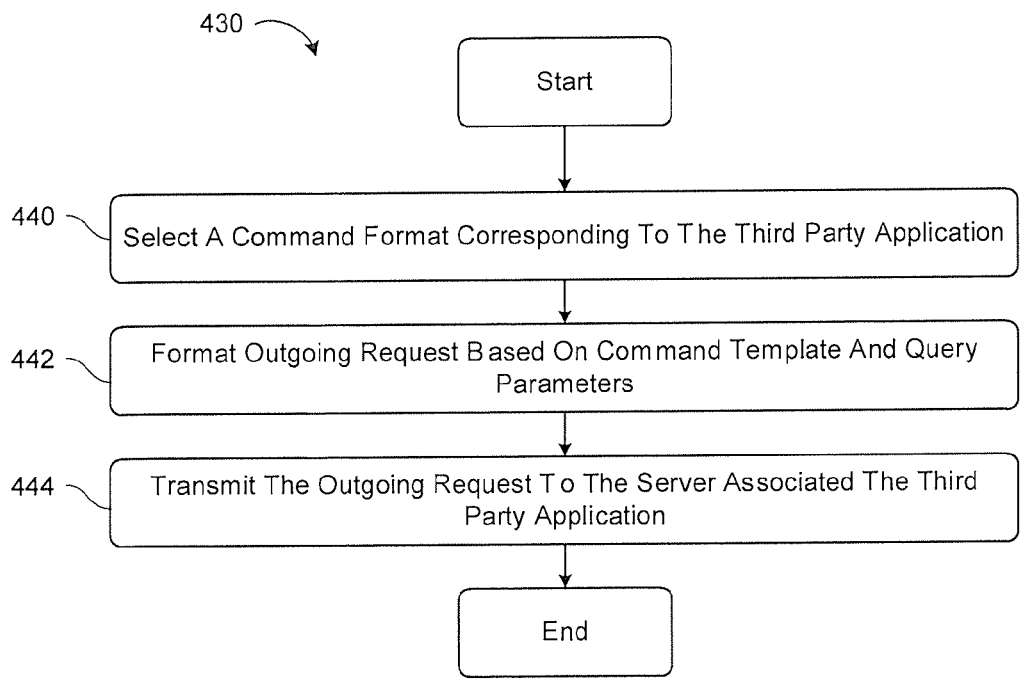

At operation 414, the forwarding module 314 transmits the query parameters 262, 264 to servers associated with each of the third party applications indicated in the set of third party applications. FIG. 4B illustrates an example method 430 for transmitting the query parameters 262, 264 to a server of a third party application. The method 430 can be repeated for each third party application indicated in the set of third party applications.

At operation 440, the forwarding module 314 selects a command template 346 corresponding to the third party application. The forwarding module 314 can obtain one or more request command templates 346c for generating requests from the command template data store 336, which can be indexed by the third party application. As previously discussed, the request command templates 346c can be human curated, provided by the application developer of the third party application, or learned from the code of the third party application. The forwarding module 314 may further be required to select a specific request command template 346c within the third party application, such that the specific request command template 346c corresponds to the functionality implicated by the query. For example, if a third party application allows a user to request reviews of restaurants and to make restaurant reservations, the third party application may be configured to receive at least requests corresponding to two different request command templates 346c. In some scenarios, the forwarding module 314 may select one or more of the request command templates 346c based on the entity types of the query. For example, if the query parameters 262, 264 include a restaurant name, a date, and a time, the forwarding module 314 may select a command template 346 for making reservations at a restaurant. Alternatively, the forwarding module 314 can select any command template 346 of the third party application that defines parameter fields that correspond to the entity types implicated by the query parameters 262, 264.

At operation 442, the forwarding module 314 formats an outgoing request based on the command template 346 and the query parameters 262, 264. The forwarding module 314 can insert the relevant query parameters 262, 264 into the parameter fields defined in the command template 346 to generate the outgoing request. The forwarding module 314 can utilize defined associations between entity types and the parameter types of the parameter fields in the request command template 346c to populate the parameter fields. For instance, if the entity type of a query term associates to a parameter type, then the forwarding module 314 populates the parameter field with the query term.

At operation 444, the forwarding module 314 can transmit the outgoing request to a server, e.g., web server 130 or application server 120, associated with the third party application. The server associated with the third party application processes the request and provides results to the search server 300.

The methods 400 and 430 of FIGS. 4A and 4B are provided for example and not intended to limit the scope of the disclosure. Variations of the methods are contemplated and within the scope of the disclosure.

Figure 5:
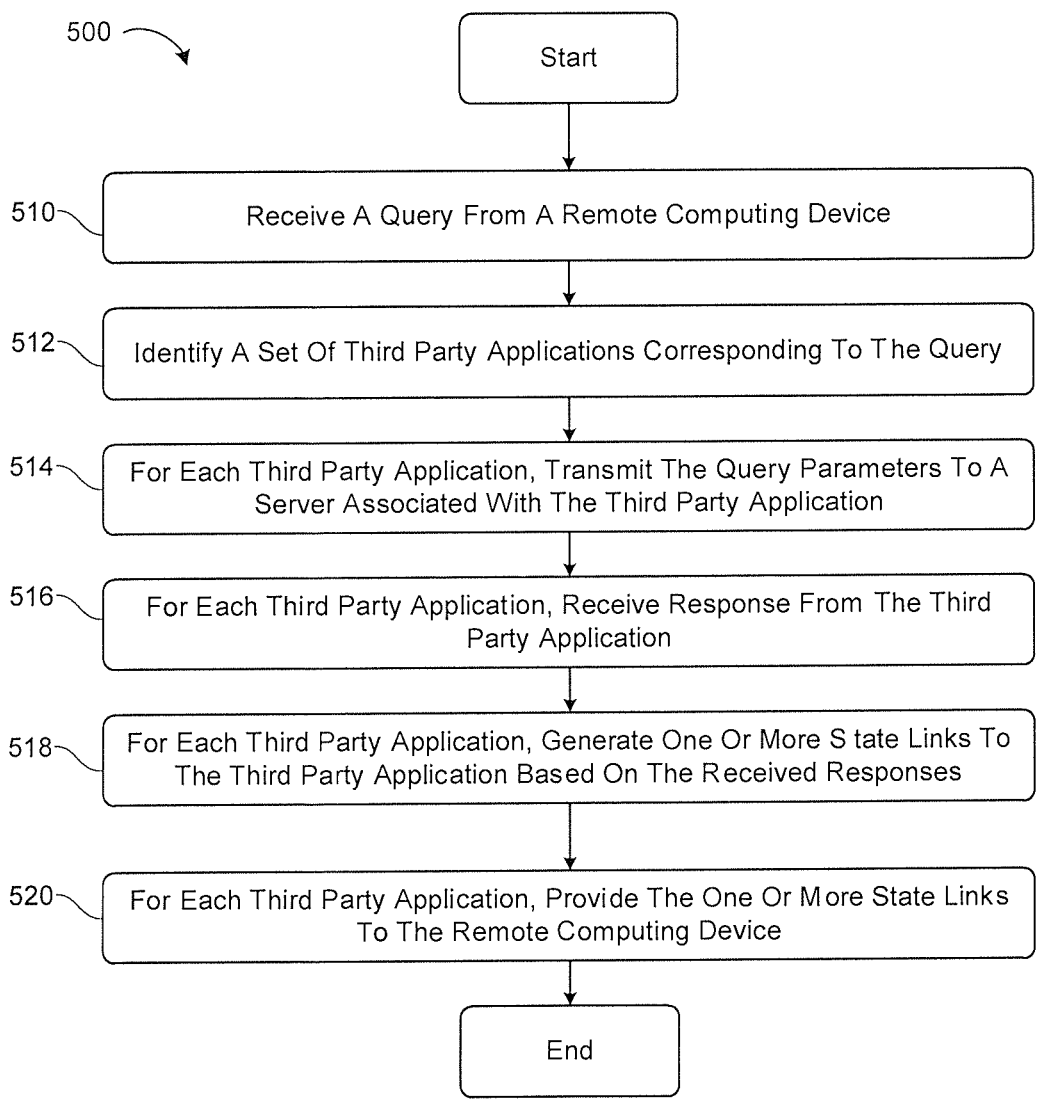
FIG. 5 illustrates an example set of operations for a method for processing a query from a remote computing device.

FIG. 5 illustrates an example set of operations for a method 500 for processing a query from a remote computing device 200. For purposes of explanation, the method 500 is described as being performed by the components of the search server 300.

At operation 510, the search module 312 receives the query (e.g., query wrapper 260) from the remote computing device 200. For purposes of explanation only, the remote computing device 200 is explained as being a remote computing device 200. In some implementations, the query may be provided from the remote computing device 200 via a partner device 140. As discussed, the query can include query parameters 262, 264, including a search query 262 and other parameters 264 such as the location of the remote computing device 200 and/or an operating system 212 of the remote computing device 200. The search module 312 parses the search query 262 to identify the query terms of the search query 262. Further, the search module 312 can perform natural language processing to extract features of the query terms.

At operation 512, the search module 312 can identify a set of one or more third party applications which correspond to the query based on the query parameters 262, 264 and/or the features of the query terms. As previously discussed, the search module 312 can perform one or more of a functional search, an entity search, and a name search to identify the set of third party applications.

At operation 514, the forwarding module 314 transmits one or more of the query parameters 262, 264 to servers associated with each of the set of third party applications. In some implementations, the forwarding module 314 can execute the method 430 described with respect to FIG. 4B when transmitting the one or more query parameters 262, 264.

At operation 516, the linking module 316 receives a response from each of the third party applications. The response may be received from, for example, a web server 130 that executes a web application version of the third party application. In this scenario, the response can include one or more web resource identifiers 365a, each of which identifying the web server 130 and one or more state parameters that indicate a state of a web application version of the third party application. For example, the response can include one or more URLs that each indicates a domain name of the web server 130 and one or more state parameters that can be used to access a particular state of the third party application. In another example, the response may be received from an application server 120 that supports a native application version of the third party application. In this scenario, the application server 120 can return one or more application resource identifier 365b, each identifying the native application 218 and one or more state parameters that indicate a state of the native application version of the third party application.

At operation 518, the linking module 316 generates one or more state links 364 for each the third party application based on the respective responses received from the servers of the third party applications. As discussed above, the state link 364 can provide a mechanism to access a state of the native application version of the third party application and/or a state of the web application version of the third party application. In implementations where the response is received from a web server 130 of the third party application and includes a web resource identifier 365a, the linking module 316 can convert the web resource identifier 365a into one or more application resource identifiers 365b based on one or more conversion rules. The linking module 316 may convert the web resource identifier 365a into multiple application resource identifiers 365b when the third party application includes more than one native application versions. In other implementations, the web server 130 or an application server 120 associated with the third party application may provide one or more application resource identifiers 365b and one or more web resource identifiers 365a in the response.

The linking module 316 embeds the one or more application resource identifiers 365b in a state link 364. The linking module 316 may further embed the web resource identifier 365a in the state link 364 and an instruction set for accessing the application. The instruction set can instruct the remote computing device 200 to attempt to access the native application 218 before using the web browsing application 216 to access the web application. Additionally or alternatively, the instruction set can instruct the remote computing device 200 to launch a native application 218 indicated in the state link 364 and can further instruct the remote computing device 200 to input the state parameters into a graphical user interface 250 of the native application 218.

At operation 520, the results module 319 transmits the state links 364 for each of the third party applications to the remote computing device 200. In some implementations, the results module 319 includes one or more state links 364 in a result object 362 corresponding to the third party application. The result processing module 319 can include additional data in each result object 362, such as one or more visual indicators 366 and/or other data 368. The result module 319 can include the result object 362 in the search results 360 and can transmit the search results 360 to the remote computing device 200.

The remote computing device 200 receives the state link 364 and can access the third party application by first attempting to launch the native application 218 indicated by the state link 364. In doing so, the remote computing device 200 provides the one or more state parameters to the native application 218, which may in turn provide the state parameters to an application server 120. If unsuccessful in launching the native application 218, the remote computing device 200 can access the web application indicated by the web resource identifier 365a in the state link 364 using its web browser application 216.

While the discussion above states for "each third party application," reference to "each third party application" does not necessarily require all identified third party applications, but each third party application that provides relevant responses. The method 500 of FIG. 5 is provided for example and not intended to limit the scope of the disclosure. Variations of the method are contemplated and within the scope of the disclosure. For example, the viewing module 318 can capture a screen shot of the application (web application or native application 218) at the state indicated by the one or more state parameters. The linking module 316 can include the screen shot in the result object 362.

Figure 6:
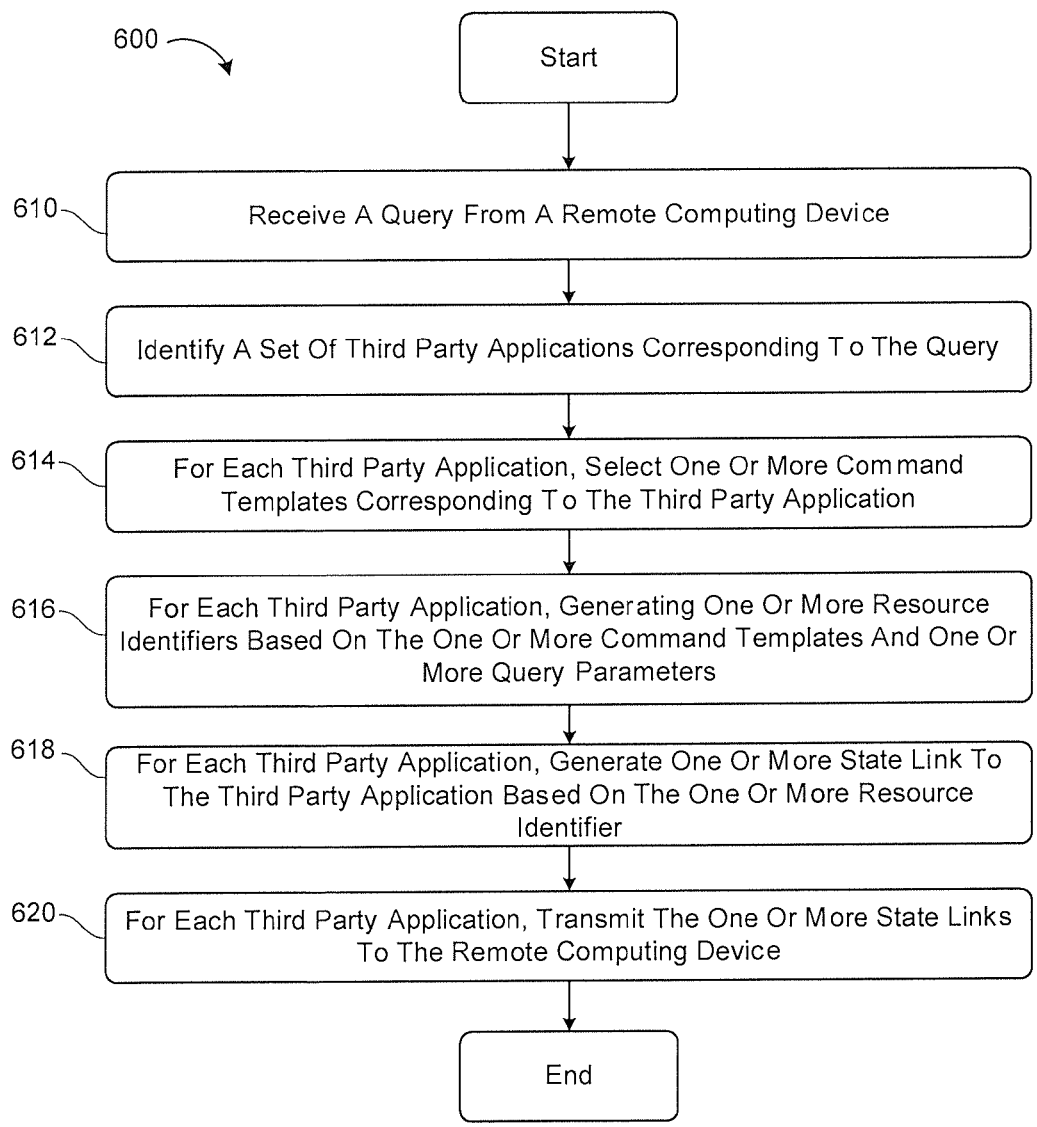
FIG. 6 illustrates an example set of operations for a method for processing a query from a remote computing device.

FIG. 6 illustrates an example set of operations for a method 600 for processing a query from a remote computing device 200. For purposes of explanation, the method 600 is described as being performed by the components of the search server 300. According to the implementations of FIG. 6, the search server 300 generates one or more resource identifiers 365 to a third party application and a state link 364 containing the resource identifiers 365 without having to provide an outgoing request to a server associated with the third party application.

At operation 610, the search module 312 receives a query from the remote computing device 200 containing query parameters 262, 264. At operation 612, the search module 312 identifies a set of one or more third party applications that correspond to the query based on the query parameters 262, 264. The search module 312 can perform one or more of a functional search, an entity search, and a name search to identify the set of third party applications.

At operation 614, the linking module 316 can determine one or more command templates 346 for each third party application in the set of third party applications. As was previously discussed, the command templates 346 of a third party application can be obtained from the command template data store 336. The linking module 316 can obtain one or more web application command templates 346a and one or more native application command templates 346b. In some implementations, the linking module 316 can select the command templates 346 based on the entity types implicated by the query parameters 262, 264. In some implementations, the linking module 316 uses an association table corresponding to the third party application to identify the entity types that may be accepted as parameters by the third party application (i.e., the parameter types accepted by the third party application). Based on the entity types implicated by the query parameters 262, 264 and the parameter types accepted by the third party application, the linking module 316 can select one or more command templates 346 from the command template data store 336. In this way, the linking module 316 retrieves one or more command templates 346 that leverage a particular functionality of the third party application. For instance, the linking module 346 can select one or more command templates 346 from a plurality of command templates 346 corresponding to the third party application based on the functionality that was implicated by the query parameters 262, 264. In this example, the selected command templates 346 can correspond to different versions of the third party application (e.g., a command template 346b for iOS native application version, a command template 346b for an ANDROID® native application version, and a command template 346a for a web application version). Moreover, for each third party application, the linking module 316 can select multiple command templates 346 to leverage different functionalities of the third party application.

At operation 616, the linking module 316 generates one or more resource identifiers 365 for each of the third party applications based on the retrieved command templates 346 and one or more of the query parameters 262, 264. For each command template 346, the linking module 316 can substitute one or more of the query parameters 262, 264 that are relevant to the command template 346 for the parameter fields defined in the command template 346, as was described above. In some scenarios, the linking module 316 can substitute identified entities in the query parameters 262, 264, or the entire search query 262 itself for parameter fields defined in the respective command templates 346a, 346b. In this way, the linking module 316 can generate one or more application resource identifiers 365b and/or one or more web resource identifiers 365a corresponding to each third party application. In some scenarios, multiple application resource identifiers 365b and/or multiple web resource identifiers 365a can correspond to the same state of the third party application. Put another way, the multiple resource identifiers 365 may reference different versions of the third party application (e.g., IOS® version, ANDROID® version, free version, and/or pay version), but may all access the same state of the third party application.

At operation 618, the linking module 316 can generate one or more state links 364 for each third party application. The linking module 316 generates a state link 364 to the third party application based on the generated resource identifiers 365. The linking module 316 can insert an application resource identifier 365b in a state link 364. The linking module 316 may further include a web resource identifier 365a in the state link 364 and an instruction set for accessing the application (e.g., attempt to access the native application 218 before using the web browsing application 216 to access the web application).

At operation 620, for each of the third party applications, the linking module 316 communicates the state link 364 to the remote computing device 200. In some implementations, the results module 319 includes each state link 364 corresponding to a third party application in a result object 362 corresponding to the third party application. The result processing module 319 can include additional data in each result object 362, such as one or more visual indicators 366 and/or other data 368. The result processing module 319 can include the result object 362 for each third party application in the set of third party applications in the search results 360 and can transmit the search results 360 to the remote computing device 200.

While the discussion above states for "each third party application," reference to "each third party application" does not necessarily require all identified third party applications, but each third party application that accepts a resource identifier 365 (web resource identifier 365a and/or application resource identifier 365b). The method 600 of FIG. 6 is provided for example and not intended to limit the scope of the disclosure. Variations of the method 600 are contemplated and within the scope of the disclosure.

Figures 7A, 7B:
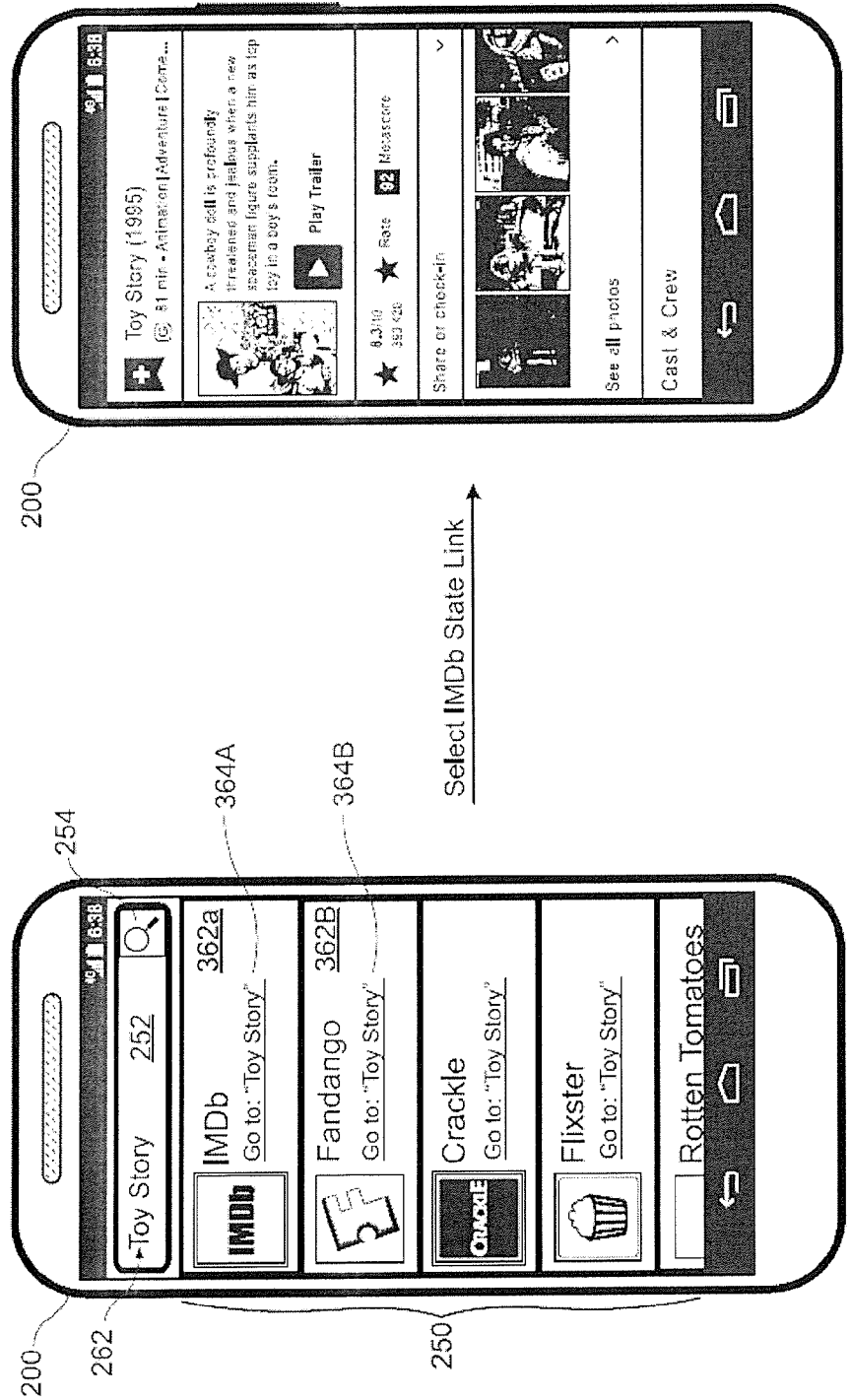

FIGS. 7A-7B illustrate an example of a search that is performed on a remote computing device 200. In FIG. 7A, a user has entered a search query 262 into a GUI 250 on the search application 214. Specifically, the user has entered the search query 262 "Toy Story" into a search box 252 of the GUI 250. In response to the search query 262, the search application 214 generates a query wrapper 260 including the search query 262 and any other parameters 264 and transmits the query wrapper 260 to the search server 300. For example, the user can select (e.g., touch or click) the search button 254 of the GUI 250 in order to initiate transmission of the query wrapper 260 to the search server 300.

The search server 300 receives the query wrapper 260 and generates search results 360 based thereon. The search server 300 may transmit search results 360 including result objects 362 corresponding to a set of third party applications. In the illustrated example, the result objects 362 correspond to "IMDB®" (e.g., native and/or web application), "FANDANGO®," "CRACKLE®," "FLIXSTER®," and "ROTTEN TOMATOES®." Each result object 362 may include one or more state links 364 corresponding to a relevant state of the application indicated in the search results 360. A user may select (e.g., touch or click) one of the state links 364 to access the resource indicated in the state link 364. In response to such a user selection, the search application 214 can instruct the operating system 212 to launch the selected third party application and to access the state of the third party application indicated in the state link 364.

In the example of FIG. 7A, the user selects the IMDB® state link 364a. In the case of the IMDB® application, the various states of the application may correspond to different entries in the IMDB® databases. The illustrated IMDB® state link 364a may include an application resource identifier 365b that indicates a state corresponding to an entry for the movie "Toy Story." Accordingly, selection of the IMDB® state link 364a causes the search application 214 to instruct the operating system 212 of the remote computing device 200 to launch the IMDB® native application 218 and to access the "Toy Story" entry on the IMDB® native application based on the application resource identifier 365b embedded in the state link 364a. FIG. 7B illustrates a GUI 250 of the selected native application 218 that was launched in response to the selection of the IMDB® state link 364a. In this example, the selected native application displays an example entry for "Toy Story."

FIGS. 8A-8B illustrate another example of a search that is performed on a remote computing device 200. In FIG. 8A, a user has entered a search query 262 into the GUI 250 of the search application 214. Specifically, the user has entered the search query "Late night diners by me" into a search bar 252 of the GUI 250. In response to receiving the search query 262, the search application 214 generates a query wrapper 260 including the search query 262 and other query parameters 264 (e.g., geo-location of the device) and transmits the query wrapper 260 to the search server 300.

The search server 300 receives the query wrapper 260 and generates search results 360 based thereon. The search server 300 may transmit search results 360 including a set of result objects 362 to the remote computing device 200. In the illustrated example, the result objects 362 identify the "YELP®", "OPENTABLE®," "TRIPADVISOR®," and "URBANSPOON®" applications. The GUI 250 may include state links 364 to the applications in the search results 360. A user may select (e.g., touch or click) the state links 364 to access the resource indicated in the state link 364. For example, a user may select the area of the GUI 250 including the OPENTABLE® icon to select a state link 364 to the OPENTABLE® application. In another example, one or more state links 364 may be provided for one or more applications listed in the search engine result page.

The GUI 250 in FIG. 8A includes a plurality of different state links 364. Three state links 364a, 364b, 364c provide access to different states of the YELP® application. In the case of YELP®, each state may correspond to a different entry. For example, the state links 364a, 364b, 364c may provide access to entries for "IHOP®," "DENNY'S®," and "TACO BELL®," respectively, in the YELP® application. In the example of FIG. 8A, the user selects the DENNY'S® state link 364b. The DENNY'S® state link 364b may include an application resource identifier 365b to an entry for the restaurant DENNY'S® in the YELP® native application. Accordingly, selecting the DENNY'S® state link 364b causes the search application 214 to instruct the operating system 212 to launch the YELP® native application and access an entry for DENNY'S® based on an application resource identifier embedded in the state link 364a. FIG. 8B shows an example GUI 250 of a selected application that the operating system 212 launched in response to the selection of the DENNY'S® state link 364b.

FIGS. 9A and 9B illustrate another example of a search that may be performed on a remote computing device 200. In FIG. 9A, a user has entered the search query "that" into the search bar 252 of the GUI 250 and executed the search by, for example, selecting the search button 254 of the GUI 250. In response to the search query 262, the search application 214 generates a query wrapper 260 including the search query 262 and any other query parameters 264 (e.g., geo-location and/or operating system of the remote computing device 200) and transmits the query wrapper 260 to the search server 300.

The search server 300 receives the query wrapper 260 and generates search results 360 based thereon. The search server 300 may transmit search results 360 including a set of result objects 362 to the remote computing device 200. The set of result objects 362 includes result objects 362 corresponding to the YELP® and OPENTABLE® applications. Each result object 362 include multiple state links 364 to the respective applications. A user may select a state link 364 to access the entry indicated in the state link 364. For example, a user may select a state link 364a corresponding to the Bangkok Bistro to view the Bangkok Bistro entry in the YELP® application.

The GUI 250 in FIG. 9A includes three state links 364a, 364b, 364c that provide access to entries in the YELP® application. For example, the state links 364a, 364b, 364c may provide access to entries for "Bangkok Bistro," "Buda Thai," and "Shana Thai Restaurant" in the YELP® application. The GUI in FIG. 9A includes three state links 364d, 364e, 364f that provide access to entries in the OPENTABLE® application. For example, the state links 364d, 364e, 364f may provide access to entries for "Baan Thai House & Wine Bar," "Basil Canteen @ 11$^{th}$ Street," and "Blackwood" in the OPENTABLE® application. The state links 364d, 364e, 364f for "Baan Thai House & Wine Bar," "Basil Canteen @ 11$^{th}$ Street," and "Blackwood," respectively, include a portion of the OPENTABLE® application GUI 910a, 910b, 910c relating to making reservations at available reservation times. In this way, the user can access the functionality of the OPENTABLE® application directly from the GUI 250 of the search application 214.

The GUI 250 of FIG. 9A also includes icons 902a, 902b that indicate whether the native applications for YELP® and OPENTABLE® are currently installed on the remote computing device 200. The "Open" icon 902a indicates that the YELP® native application can be launched by the remote computing device 200, which implies that the YELP® native application is installed on the remote computing device 200. The user may select (e.g., touch) the "Open" icon 902a to launch the YELP® native application to a default state (e.g., a home screen" of the YELP® native application). The "Free" icon 902b indicates that the OPENTABLE® native application can be downloaded to the remote computing device 200 and is not installed thereon. In some examples, a user may select the "Free" icon 902b to launch an application marketplace (e.g., GOOGLE PLAY® or the APP STORE®) that provides the OPENTABLE® native application for download or to automatically start downloading the OPENTABLE® native application to the remote computing device 200. Selecting the Baan Thai House & Wine Bar state link 364d may cause the search application to attempt to launch the OPENTABLE® native application. When the remote computing device 200 determines that the attempt was unsuccessful, the search application 214 can instruct the operating system 212 to access the entry for Baan Thai House & Wine Bar in the OPENTABLE® web application based on the web resource identifier 365a embedded in the state link 364d. FIG. 9B illustrates a GUI 250 of the OPENTABLE® web application that is displayed by the web browser of the remote computing device 200 in response to selection of the Baan Thai House & Wine Bar state link 364d.

Figure 10:
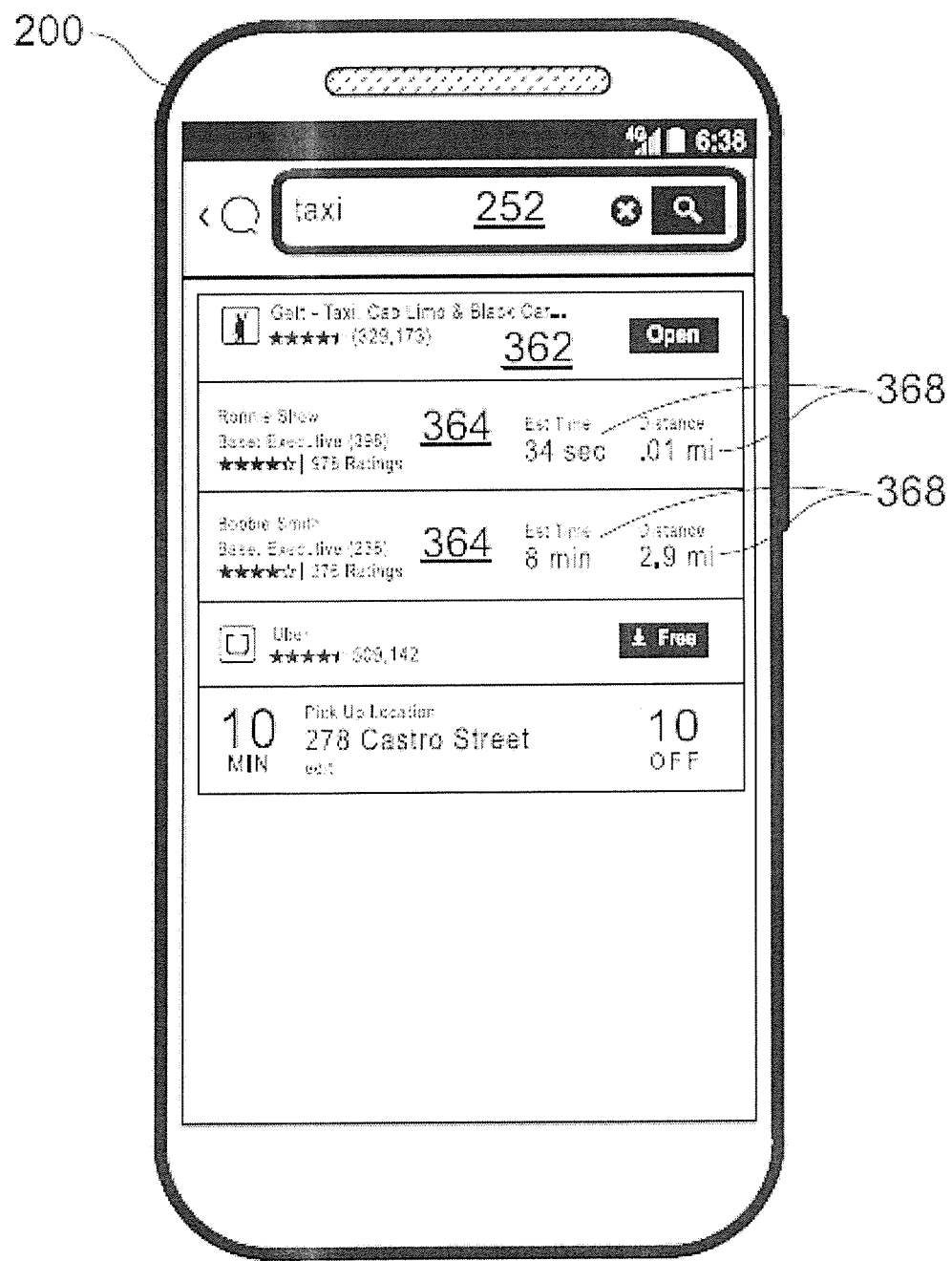

FIG. 10 illustrates another example of a search being performed on a remote computing device 200. In FIG. 10, the user has entered the search query "taxi" into the search bar 252 of the GUI 250. As described above, the search server 300 receives a query wrapper 260 containing the search query 262 and other query parameters 264 (e.g., geo-location of the remote computing device 200) from the remote computing device 200 and generates search results 360 based on the query wrapper 260. In the example of FIG. 10, the search server 300 may forward a geo-location query parameter 264 to a server associated with the GETT® application in a request. In response, the server associated with the GETT® application may return dynamic data, such as estimated distances of various taxi drivers with respect to the remote computing device 200 and an estimated amount of time that that it would take for the taxi driver to arrive to the user. The search server 300 can embed the dynamic data in the state links 364, such that the GUI 250 displays the dynamic data as additional data 368 in the state link 364. If the user wishes to make a taxi reservation, the user can select one of the state links 364 to make the taxi reservation. Selection of a state link 364 can launch the GETT® native application thereby initiating the taxi reservation.

The searches explained with respect to FIGS. 7A-10 are provided for example only and are not intended to limit the types of searches that may be performed. Further, the results of the searches are provided for example only and various search results 360 may be displayed in any other suitable manner.

Figure 11A:
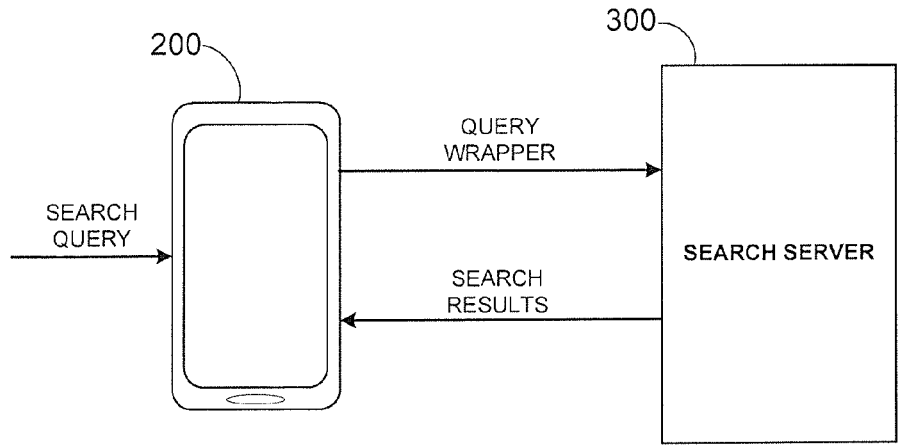
FIGS. 11A and 11B illustrate an example set of operations for a method for processing a query.
Figure 11B:
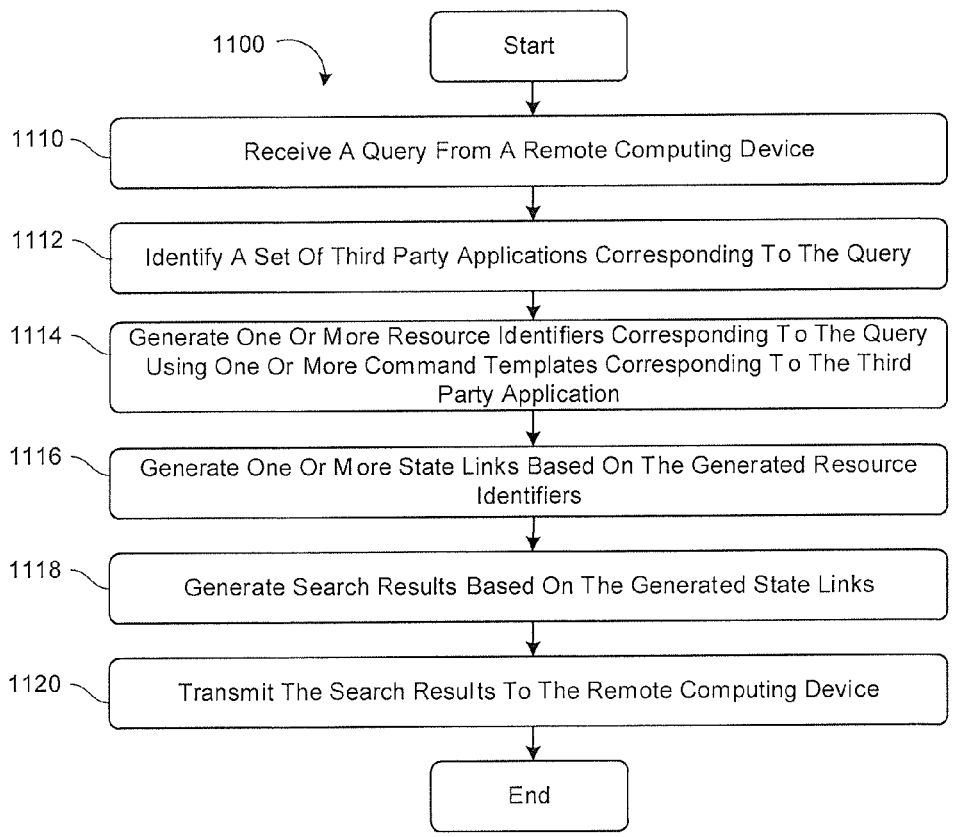

FIGS. 11A and 11B illustrate example operations performed by a search server 300 for processing a query received from a remote computing device 200. The operations 1100 described herein may be performed by the processing device 310 of the search server 300.

At operation 1110, the search server 300 receives a query from a remote computing device 200. In some implementations, the query is included in a query wrapper 260 that contains query parameters 264. The query parameters 262, 264 can include a search query 262 (i.e., one or more query terms). In some implementations, the query parameters 262, 264 can further include additional query parameters 264 (e.g., a geo-location of the remote computing device 200, an operating system 212 of the remote computing device 200, a device type of the remote computing device 200, and/or a username of the user of the remote computing device 200).

At operation 1112, the search server 300 identifies a set of third party applications corresponding to the query. The search server 300 can perform one or more of a functional search, an entity search, or a name search using the query parameters 262, 264 received in the query wrapper 260. The result of the search or searches is a set of third party applications that are relevant to one or more of the query parameters 262, 264 provided in the query wrapper by the remote computing device 200.

At operation 1114, the search server 300 generates one or more resource identifiers 365 for the third party applications indicated in the set of third party applications. For a third party application, the search server 300 generates resource identifiers 365 based on the query parameters 262, 264 and the command templates 346 corresponding to the third party application. The search server 300 can identify relevant command templates 346 from the command template data store 336 based on entity types of one or more of the query parameters 262, 264. For example, if the query parameters 262, 264 include a movie name and a time and the set of applications include an application for finding movie times at movie theatres near the remote computing device 200, the search server 300 may identify one or more command templates 346 that receive these types of parameters. The search server 300 may utilize an association table corresponding to the third party application to identify the relevant parameters that were included in the query parameters 262, 264. The search server 300 can identify web application command templates 346a and/or native application command templates 346b for the third party application. The search server 300 can substitute the relevant query parameters 262, 264 into the parameters fields defined in the command templates 346, each time generating a resource identifier 365.

At operation 1116, the search server 300 generates one or more state links 364 for the third party applications based on the generated resource identifiers 365. The search server 300 can embed the generated application resource identifiers 365b and/or web resource identifiers 365a into a state link 364. In some scenarios, the search server 300 can select more than one resource identifier 365 to embed in a state link 364. For example, if the third party application accepts both application resource identifiers 365b (for launching a native application 218 of the third party application to a specified state) and web resource identifiers 365a (for accessing a web application of the third party application at a specified state), then the search server 300 can select multiple resource identifiers 365 for inclusion in the state link 364, provided the resource identifiers 365 correspond to the same state (e.g., provide the same information). When the state link 364 contains more than one resource identifier, the search server 300 can further include a set of instructions indicating an order by which the resource identifiers can be selected. For example, the set of instructions can instruct the remote computing device 200 to attempt to launch the native application 218 using the application resource contained in the state link 364, and if unsuccessful, to access the web application using the web resource identifier 365a contained in the state link 364. In some implementations, the search server 300 includes additional data in the state link 364. For example, the search server 300 can include visual indicators 366 (e.g., icons, logos, screen shots, GUI 250 elements of the third party application) and/or metadata (e.g., descriptions, ratings, rankings, and dynamic data) in the state link 364. The additional data can be obtained from any suitable source, including a server associated with the third party application, the application data store 332, and/or the entity data store 334.

At operation 1118, the search server 300 generates search results 360 based on the generated state links 364. For each third party application in the set of third party applications, the search server 300 can group the state links 364 for the third party application together. The search server 300 can then generate a result object 362 for the third party application based on the grouped state links 364. The search results 360 include the result objects 362 corresponding to each of the third party applications.

At operation 1120, the search server 300 transmits the search results 360 to the remote computing device 200. The remote computing device 200 can then display the search results 360 via its user interface device 240. The user can access a state of a third party application indicated in the search results (360) by selecting a state link 364 included in the search results 360.

Figure 12A:
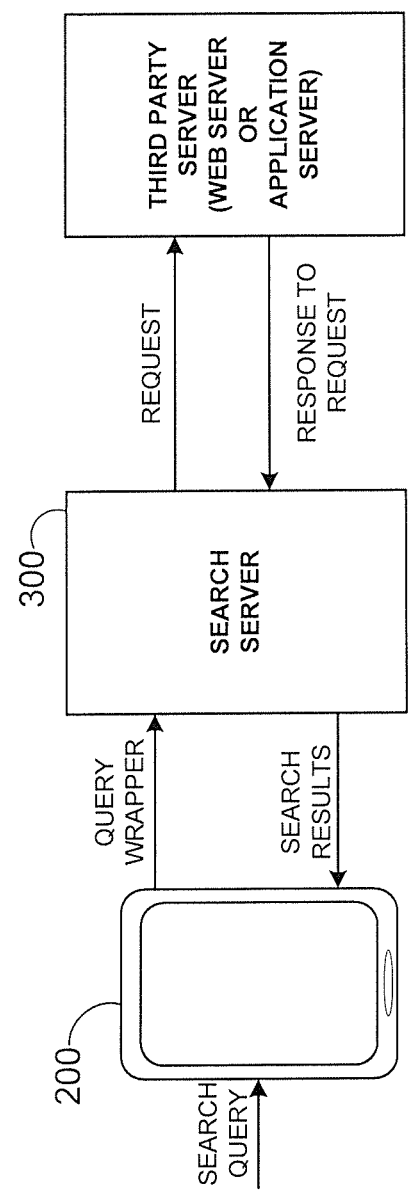
FIGS. 12A and 12B illustrate an example set of operations for a method for processing a query.
Figure 12B:
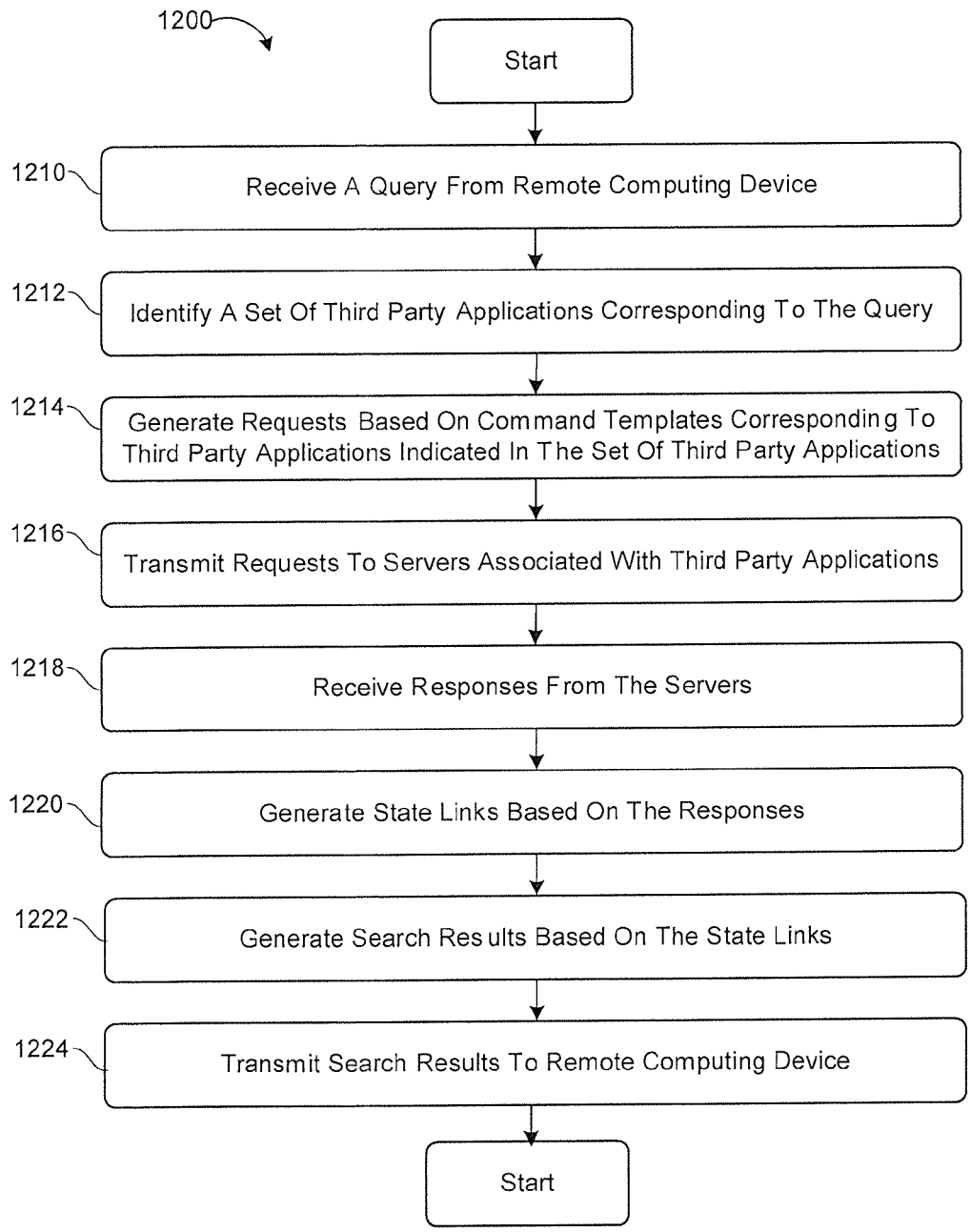

FIGS. 12A and 12B illustrate example operations 1200 performed by a search server 300 processing a query received from a remote computing device 200. The operations 1200 described herein may be performed by the processing device 310 of the search server 300.

At operation 1210, the search server 300 receives a query from a remote computing device 200. In some implementations, the query is included in a query wrapper 260 that contains query parameters 262, 264. The query parameters 262, 264 can include a search query 262 (i.e., one or more query terms). In some implementations, the query parameters 262, 264 can further include additional query parameters 264 (e.g., a geo-location of the remote computing device 200, an operating system of the remote computing device 200, a device type of the remote computing device 200, and/or a username of the user of the remote computing device 200).

At operation 1212, the search server 300 identifies a set of third party applications corresponding to the query. The search server 300 can perform one or more of a functional search, an entity search, or a name search using the query parameters 262, 264 received in the query. The result of the search or searches is a set of third party applications that are relevant to one or more of the query parameters 262, 264 provided in the query by the remote computing device 200.

At operation 1214, the search server 300 generates requests based on request command templates 346c corresponding to the third party applications. For each relevant third party application, the search server 300 retrieves one or more request command templates 346c from the command template data store 336. The search server 300 can determine which request command templates 346c to retrieve based on the entity types contained in the query. In some implementations, the search server 300 utilizes an association table to identify relevant request command templates 346c. The search server 300 can insert identified entities from the query into the parameter fields of a request command template 346c to generate a request.

At operation 1216, the search server 300 transmits the requests to the servers of the third party applications indicated in the set of third party applications. In some implementations, the requests for a particular third party application can be sent to a web server 130 of the third party application. At operation 1218, the search server 300 receives responses from the servers of the third party applications. In implementations where the server is a web server 130, the response can include a web resource identifier 365*a* of a state corresponding to the parameters included in the request. The search server 300 may receive multiple responses from multiple servers.

At operation 1220, the search server 300 generates state links 364 based on the responses. In some implementations, the search server 300 can convert the web resource identifiers 365*a* received in the responses into application resource identifiers 365*b* based on conversion rules corresponding to each respective third party application. In some scenarios, a conversion rule can result in multiple application resource identifiers 365*b* being converted from a web resource identifier 365*a* (e.g., in the case of multiple versions of the native application 218). The search server 300 can group application resource identifiers 365*b* and a web resource identifier 365*a* corresponding to the same state of the third party application together. The search server 300 can embed the grouped application resource identifiers 365*b* and web resource identifier 365*a* into a state link 364. In this way, the search server 300 can generate multiple state links 364 for a third party application, and can generate one or more state links 364 for each of the third party applications indicated in the set of third party applications. When the state link 364 contains more than one resource identifier 365 (e.g., one or more application resource identifiers 365*b* and a web resource identifier 365*a*), the search server 300 can further include a set of instructions indicating an order by which the resource identifiers 365 can be selected. For example, the set of instructions can instruct the remote computing device 200 to attempt to launch the native application 218 using the application resource identifier 365*b* contained in the state link 364 and if unsuccessful to access the web application using the web resource identifier 365*a* contained in the state link 364. In some implementations, the search server 300 includes additional data in the state link 364. For example, the search server 300 can include visual indicators 366 (e.g., icons, logos, screen shots, GUI 250 elements of the third party application) and/or metadata (e.g., descriptions, ratings, rankings, dynamic data) in the state link 364. The additional data can be obtained from any suitable source, including a server associated with the third party application, the application data store 332, and/or the entity data store 334.

At operation 1222, the search server 300 generates search results 360 based on the state links 364. For each third party application having at least one state link 364 generated therefor, the search server 300 can group the state links 364 for the third party application together. The search server 300 can then generate a result object 362 for the third party application based on the grouped state links 364. The search results 360 include the result objects 362 corresponding to each of the third party applications.

At operation 1224, the search server 300 transmits the search results 360 to the remote computing device 200. The remote computing device 200 can then display the search results 360 via its user interface device 240. The user can access a state of a third party application indicated in the search results 360 by selecting a state link 364 included in the search results 360.

Computing Machine Architecture

Figure 13:
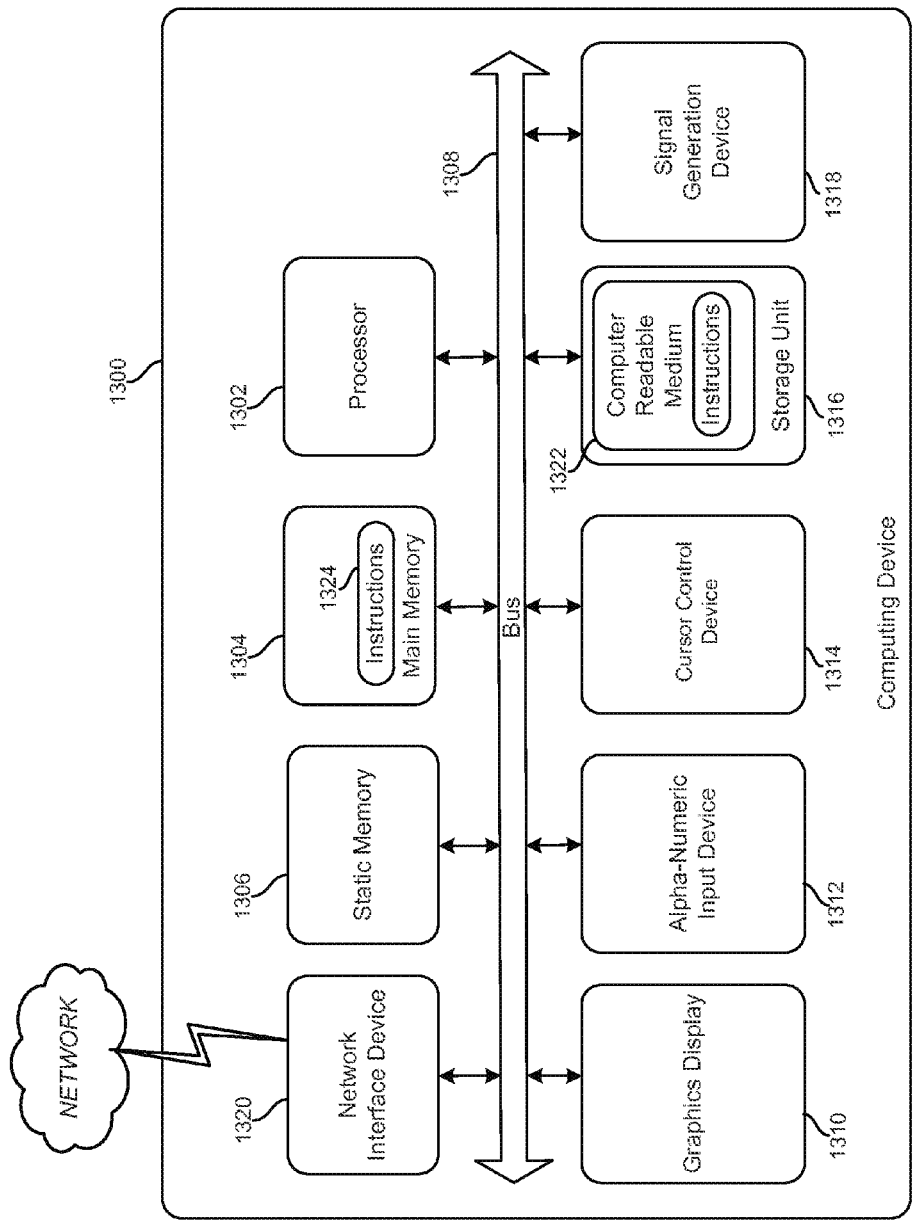
FIG. 13 illustrates one embodiment of components of an example machine able to read instructions from a machine-readable medium and execute them in a processor (or controller).

FIG. 13 is a block diagram illustrating components of an example machine able to read instructions from, for example, a non-transitory machine-readable medium and execute them in one or more processors (or controllers). Specifically, FIG. 13 shows a diagrammatic representation of a machine in the example form of a computer system 1300 within which instructions 1324 (e.g., software or program code) for causing the machine to perform any one or more of the methodologies discussed herein may be executed. The methodologies include those described with respect to FIGS. 3A, 3B, 4, 5, and 6. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing device such as a tablet computer, an ultrabook (or netbook) computer, a personal digital assistant (PDA), a cellular telephone, a smartphone, a web appliance, or like machine capable of executing instructions 1324 (sequential or otherwise) that specify actions to be taken by that machine. Further, while only a single machine is illustrated, the term "machine" shall also be taken to include any collection of machines that individually or jointly execute instructions 1324 to perform any one or more of the methodologies discussed herein.

The example computer system 1300 includes one or more processors 1302 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 1300 also includes a main memory 1304 and a static memory 1306. The components of the computing system are configured to communicate with each other via a bus 1308. The computer system 1300 may further include a graphics display unit 1310 (e.g., a plasma display panel (PDP), a liquid crystal display (LCD), glass display) which may be configured for capacitive or inductive touch sensitivity to allow for direct interaction with software user interfaces through the display 1310. The computer system 1300 may also include an alphanumeric input device 1312 (e.g., a keyboard), a cursor control device 1314 (e.g., a mouse, a trackball, a joystick, a motion sensor, or other pointing instrument), a storage unit 1316, a signal generation device 1318 (e.g., a speaker), and a network interface device 1320, which also are configured to communicate via the bus 1308.

The storage unit 1316 includes a machine-readable medium 1322 on which is stored instructions 1324 (e.g., software) embodying any one or more of the methodologies or functions described herein. The instructions 1324 (e.g., software) may also reside, completely or at least partially, within the main memory 1304 or within the processor 1302 (e.g., within a processor's cache memory) during execution thereof by the computer system 1300, the main memory 1304 and the processor 1302 also constituting machine-readable media. The instructions 1324 (e.g., software) may be transmitted or received over a network 1326 via the network interface device 1320.

While machine-readable medium 1322 is shown in an example embodiment to be a single medium, the term "machine-readable medium" should be taken to include a single medium or multiple media (e.g., a centralized or distributed database, or associated caches and servers) able to store instructions (e.g., instructions 1324). The term "machine-readable medium" shall also be taken to include any medium that is capable of storing instructions (e.g., instructions 1324) for execution by the machine and that cause the machine to perform any one or more of the methodologies disclosed herein. The term "machine-readable medium" includes, but may not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various implementations of the systems and methods described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, scripts, or program code) include machine instructions, e.g., 1324, for a programmable processor, e.g., 1302, and can be implemented in a high-level procedural and/or object-oriented programming language, and/or in assembly/machine language. The computer programs can be structured functionality in units referenced as "modules," for example, as illustrated in FIG. 2. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

Upon reading this disclosure, those of skill in the art will appreciate still additional alternative structural and functional designs for a system and a process for deep search in computing environments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

receiving, by a processing device of a search server, a query containing one or more query parameters from a remote computing device;

identifying, by the processing device, a set of third party applications corresponding to the one or more query parameters; and for each third party application:

transmitting, by the processing device, a request containing at least a subset of the one or more query parameters to a server associated with the third party application;

receiving, by the processing device, a response from the server associated with the third party application, wherein the response indicates a state of the third party application that relates to the query parameters contained in the request; and generating, by the processing device, a state link to a native application version of the third party application based on the response, wherein the state link provides access to the state of the third party application, wherein the state link includes at least one application resource identifier and at least one web resource identifier, and wherein the state link is configured to, upon selection of the state link by a user of the remote computing device, initiate an attempt to launch the state on the native application version of the third party application using the application resource identifier before initiating an attempt to launch a web application version of the third party application using the web resource identifier; and providing, by the processing device, search results containing the state link to the remote computing device.

2. The method of claim 1, wherein the application resource identifier indicates a reference to the native application version and one or more state parameters corresponding to the state, and wherein the one or more state parameters are used by the native application version to access the state.

3. The method of claim 2, wherein the web resource identifier indicates a domain name of a web server associated with the third party application and the one or more state parameters, and wherein the web server hosts a web application version of the third party application.

4. The method of claim 1, wherein transmitting the request containing at least the subset of the one or more query parameters includes transmitting the request to a web server that hosts a web application that is a web application version of the third party application.

5. The method of claim 4, wherein transmitting the request containing at least the subset of the one or more query parameters further includes:
selecting a command template corresponding to the third party application from a plurality of command templates;
formatting the request based on the command template and at least the subset of the one or more query parameters; and
transmitting the request to the web server.

6. The method of claim 5, wherein receiving the response includes receiving a web resource identifier indicating a domain name of a web server associated with the third party application and one or more state parameters corresponding to a state of the web application that are used by the web application to access the state.

7. The method of claim 6, wherein determining the state link to the native application version includes converting the web resource identifier to an application resource identifier indicating a reference to the native application version of the third party application and the one or more state parameters, wherein the remote computing device is configured to use the application resource identifier to launch the native application version to the state indicated by the one or more state parameters.

8. The method of claim 1, wherein the state link includes a screen shot indicative of the state.

9. The method of claim 1, wherein the one or more query parameters include a search query including one or more query terms.

10. The method of claim 1, wherein the one or more query parameters further include one or more of a geolocation of the remote computing device, an operating system of the remote computing device, or an identifier of a user of the remote computing device.

11. A search server comprising:
a network interface device;
a processing device, the processing device executing computer readable instructions that when executed by the processing device cause the processing device to:
receive a query containing one or more query parameters from a remote computing device;
identify a set of third party applications corresponding to the one or more query parameters; and
for each third party application:
transmit a request containing at least a subset of the one or more query parameters to a server associated with the third party application;
receive a response from the server associated with the third party application, wherein the response indicates a state of the third party application that relates to the query parameters contained in the request; and
generate a state link to a native application version of the third party application based on the response, wherein the state link provides access to the state of the third party application, wherein the state link includes at least one application resource identifier and at least one web resource identifier, and wherein the state link is configured to, upon selection of the state link by a user of the remote computing device, initiate an attempt to launch the state on the native application version of the third party application using the application resource identifier before initiating an attempt to launch a web application version of the third party application using the web resource identifier; and
provide search results containing the state link to the remote computing device.

12. The search server of claim 11, wherein the application resource identifier indicates a reference to the native application version and one or more state parameters corresponding to the state, and wherein the one or more state parameters is used by the native application version to access the state.

13. The search server of claim 12, wherein the web resource identifier indicating a domain name of a web server associated with the third party application and the one or more state parameters, and wherein the web server hosts a web application version of the third party application.

14. The search server of claim 11, wherein the computer readable instructions cause the processing device to transmit the request containing at least the subset of the one or more query parameters by:
transmitting the request to a web server that hosts a web application that is a web application version of the third party application.

15. The search server of claim 14, wherein the computer readable instructions further cause the processing device to transmit the request containing at least the subset of the one or more query parameters by:
selecting a command template corresponding to the third party application from a plurality of command templates;
formatting the request based on the command template and at least the subset of the one or more query parameters; and
transmitting the request to the web server.

16. The search server of claim 15, wherein the computer readable instructions cause the processing device to receive the response by:
receiving a web resource identifier indicating a domain name of a web server associated with the third party application and one or more state parameters corresponding to a state of the web application that are used by the web application to access the state.

17. The search server of claim 16, wherein the computer readable instructions cause the processing device to determine the state link to the native application version by:
converting the web resource identifier to an application resource identifier indicating a reference to the native application version of the third party application and the one or more state parameters, wherein the remote computing device is configured to use the application resource identifier to launch the native application version to the state indicated by the one or more state parameters.

18. The search server of claim 11, wherein the state link includes a screen shot indicative of the state.

19. The search server of claim 11, wherein the one or more query parameters include a search query including one or more query terms.

20. The search server of claim 11, wherein the one or more query parameters further include one or more of a geolocation of the remote computing device, an operating system of the remote computing device, or an identifier of a user of the remote computing device.

\* \* \* \* \*